US011087553B2

(12) United States Patent
Varshney et al.

(10) Patent No.: US 11,087,553 B2
(45) Date of Patent: Aug. 10, 2021

(54) INTERACTIVE MIXED REALITY PLATFORM UTILIZING GEOTAGGED SOCIAL MEDIA

(71) Applicant: UNIVERSITY OF MARYLAND, COLLEGE PARK, College Park, MD (US)

(72) Inventors: Amitabh Varshney, Potomac, MD (US); Ruofei Du, Greenbelt, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 16/734,290

(22) Filed: Jan. 3, 2020

(65) Prior Publication Data

US 2020/0219323 A1 Jul. 9, 2020

Related U.S. Application Data

(60) Provisional application No. 62/788,577, filed on Jan. 4, 2019.

(51) Int. Cl.
*G06T 19/00* (2011.01)
*H04L 29/08* (2006.01)
(Continued)

(52) U.S. Cl.
CPC ............ *G06T 19/006* (2013.01); *G06T 17/05* (2013.01); *H04L 51/20* (2013.01); *H04L 51/32* (2013.01); *H04L 67/18* (2013.01)

(58) Field of Classification Search
CPC ........ G06T 19/006; G06T 17/05; H04L 51/20
See application file for complete search history.

(56) References Cited

U.S. PATENT DOCUMENTS 9,922,437 B1 * 3/2018 Baron .................. G06T 19/006
10,204,530 B1 * 2/2019 Cramer ................. A63F 9/1204
(Continued)

OTHER PUBLICATIONS

Du, R., & Varshney, A. (Jul. 2016). Social street view: blending immersive street views with geo-tagged social media. In Web3D (pp. 77-85).*

(Continued)

*Primary Examiner* — Sarah Lhymn
(74) *Attorney, Agent, or Firm* — Carter, DeLuca & Farrell LLP; George Likourezos; David C. Lee

(57) ABSTRACT

An end-user system in accordance with the present disclosure includes a communication device configured to communicate with a server, a display screen, one or more processors, and at least one memory storing instructions which, when executed by the processor(s), cause the end-user system to access a physical world geographical location from a user, access two-dimensional physical world map data for a region surrounding the physical world geographical location, render for display on the display screen a three-dimensional mirrored world portion based on the two-dimensional physical world map data and render an avatar at a mirrored world location corresponding to the physical world geographical location, access geotagged social media posts which have geotags in the region and which the user is permitted to view, and render the geotagged social media posts as three-dimensional objects in the mirrored world portion.

20 Claims, 15 Drawing Sheets

(51) Int. Cl.
*G06T 17/05* (2011.01)
*H04L 12/58* (2006.01)

(56) References Cited

U.S. PATENT DOCUMENTS

| | | | | |
|---|---|---|---|---|
| 2005/0099420 | A1* | 5/2005 | Hoppe | G06T 17/20 345/420 |
| 2008/0016472 | A1* | 1/2008 | Rohlf | G06F 16/9537 715/848 |
| 2010/0100851 | A1* | 4/2010 | Clark | G06T 19/00 715/849 |
| 2013/0021445 | A1* | 1/2013 | Cossette-Pacheco | G06T 15/40 348/46 |
| 2013/0249948 | A1* | 9/2013 | Reitan | G06T 19/006 345/633 |
| 2014/0236916 | A1* | 8/2014 | Barrington | G06Q 10/10 707/706 |
| 2015/0062114 | A1* | 3/2015 | Ofstad | G06F 3/04842 345/419 |
| 2015/0070351 | A1* | 3/2015 | Tarquini | G06T 19/20 345/419 |
| 2017/0148186 | A1* | 5/2017 | Holzer | H04N 5/265 |
| 2017/0148199 | A1* | 5/2017 | Holzer | H04N 5/265 |
| 2017/0337744 | A1* | 11/2017 | Martin | G01S 19/14 |
| 2018/0139431 | A1* | 5/2018 | Simek | H04N 5/2258 |
| 2019/0213773 | A1* | 7/2019 | Lee | H04L 67/12 |
| 2019/0356898 | A1* | 11/2019 | Choi | H04N 13/139 |
| 2020/0058165 | A1* | 2/2020 | Choi | G06T 5/50 |

OTHER PUBLICATIONS

Krylov, V. A., Kenny, E., & Dahyot, R. (2018). Automatic discovery and geotagging of objects from street view imagery. Remote Sensing, 10(5), 661, pp. 1-20.*

Du et al., "Project Geollery.com: Reconstructing a Live Mirrored World With Geotagged Social Media," Web3D '19, Jul. 26-28, 2019, Los Angeles, CA, USA, pp. 1-9.

Du et al., "Geollery: A Mixed Reality Social Media Platform," CHI 2019, May 4-9, 2019, Glasgow, Scotland UK, pp. 1-13.

Open Street Map, About, https://www.openstreetmap.org/about, accessed May 1, 2020.

Three.js, Core, Object3D, https://threejs.org/docs/index.html#api/en/core/Object3D, accessed May 1, 2020.

* cited by examiner

INTERACTIVE MIXED REALITY PLATFORM UTILIZING GEOTAGGED SOCIAL MEDIA

CROSS-REFERENCE TO RELATED APPLICATION

This application claims the benefit of, and priority to, U.S. Provisional Patent Application No. 62/788,577, filed on Jan. 4, 2019. The entire contents of the foregoing application are hereby incorporated by reference.

BACKGROUND

Technical Field

The present disclosure relates to social media platforms, and more particularly, to mixed reality social media platforms.

Related Art

Social media plays a significant role in many people's daily lives covering a wide range of topics such as restaurant reviews, updates from friends, and local events. Despite the innovations in virtual and augmented reality, existing social media platforms typically use a linear narrative or a grid layout. While these typical layouts are efficient for quickly browsing through social media posts, they lack the spatial context associated with social media posts.

Technologies and designs have emerged for visualizing social media in "mirrored worlds," which are a representation of the real world in digital form which attempts to map real-world structures in a geographically accurate way. Nevertheless, designing an interactive social platform with immersive geographical environments remains a challenge due, for example, to the real-time constraints of rendering 3D buildings. 3D models of the physical world are widely used to some extent in a diverse set of applications including virtual tourism, geographical education, neighborhood auditing, and urban planning. However, interactive reconstruction of a mirrored world remains a significant challenge. In addition, the design space of visualizing and interacting with social media in mixed reality settings is not yet adequately explored. Accordingly, there is interest in developing social media in mixed reality settings.

SUMMARY

The present disclosure relates to an interactive mixed reality social media platform for rendering a mirrored world in real time and creating, sharing, and/or exploring geotagged information in a mirrored world.

In accordance with aspects of the present disclosure, an end-user system includes a communication device configured to communicate with a server, a display screen, one or more processors, and at least one memory storing instructions. The instructions, when executed by the one or more processors, cause the end-user system to access a physical world geographical location from a user, access two-dimensional physical world map data for a region surrounding the physical world geographical location, render for display on the display screen a three-dimensional mirrored world portion based on the two-dimensional physical world map data and render an avatar at a mirrored world location corresponding to the physical world geographical location, access geotagged social media posts which have geotags in the region and which the user is permitted to view, and render the geotagged social media posts as three-dimensional objects in the mirrored world portion.

In various embodiments of the end-user system, the rendered three-dimensional mirrored world portion corresponds to a 360-degree field of view about the mirrored world location.

In various embodiments of the end-user system, other mirrored world portions outside the 360-degree field of view are not rendered until the avatar is moved toward the other mirrored world portions.

In various embodiments of the end-user system, the instructions, when executed by the one or more processors, further cause the end-user system to communicate, via the communication device, movements of the avatar to the server, receive from the server further two-dimensional physical world map data corresponding to a new mirrored world location of the avatar, and render, for display on the display screen, a second mirrored world portion based on the further two-dimensional physical world map data.

In various embodiments of the end-user system, the two-dimensional physical world map data includes at least one 360-degree street view image.

In various embodiments of the end-user system, in rendering the three-dimensional mirrored world portion based on the two-dimensional physical world map data, the instructions, when executed by the one or more processors, cause the end-user system to determine whether the mirrored world location is outside or inside a boundary of a mesh corresponding to the at least one 360-degree street view image, in case the mirrored world location is inside the boundary, render the three-dimensional mirrored world portion at a first level of detail, and in case the mirrored world location is outside the boundary, render the three-dimensional mirrored world portion at a second level of detail, where the first level of detail has greater detail than the second level of detail.

In various embodiments of the end-user system, in rendering the three-dimensional mirrored world portion at the first level of detail, the instructions, when executed by the one or more processors, cause the end-user system to texture the mesh using the at least one 360-degree street view image, and in case the at least one 360-degree street view image includes two or more images, blend a seam between the two or more images.

In various embodiments of the end-user system, in rendering the three-dimensional mirrored world portion at the second level of detail, the instructions, when executed by the one or more processors, cause the end-user system to access polygon data and height data in the two-dimensional physical world map data where the polygon data and the height data relate to buildings, render three-dimensional polyhedrons corresponding to the buildings based on the polygon data and the height data, and texture sides of the polyhedrons corresponding to the 360-degree street view image based on the 360-degree street view image.

In various embodiments of the end-user system, in rendering the geotagged social media posts as three-dimensional objects in the mirrored world portion, the instructions, when executed by the one or more processors, cause the end-user system to render at least one of a balloon object displaying a social media post, or a frame displaying one or more selected from a social media image, text, videos, and a collaborative drawing board.

In various embodiments of the end-user system, in rendering the geotagged social media posts as three-dimensional objects in the mirrored world portion, the instructions, when executed by the one or more processors, cause the end-user system to render at least one of a stack of objects, a poster grid of objects, or a temporal transition of objects.

In accordance with aspects of the present disclosure, a method in an end-user system is disclosed. The method includes accessing a physical world geographical location from a user, accessing two-dimensional physical world map data for a region surrounding the physical world geographical location, rendering for display on a display screen a three-dimensional mirrored world portion based on the two-dimensional physical world map data and render an avatar at a mirrored world location corresponding to the physical world geographical location, accessing geotagged social media posts which have geotags in the region and which the user is permitted to view, and rendering the geotagged social media posts as three-dimensional objects in the mirrored world portion.

In various embodiments of the method, the rendered three-dimensional mirrored world portion corresponds to a 360-degree field of view about the mirrored world location.

In various embodiments of the method, other mirrored world portions outside the 360-degree field of view are not rendered until the avatar is moved toward the other mirrored world portions.

In various embodiments of the method, the method includes communicating, via a communication device, movements of the avatar to a server, receiving from the server further two-dimensional physical world map data corresponding to a new mirrored world location of the avatar, and rendering, for display on the display screen, a second mirrored world portion based on the further two-dimensional physical world map data.

In various embodiments of the method, the two-dimensional physical world map data includes at least one 360-degree street view image.

In various embodiments of the method, rendering the three-dimensional mirrored world portion based on the two-dimensional physical world map data includes determining whether the mirrored world location is outside or inside a boundary of a mesh corresponding to the at least one 360-degree street view image, in case the mirrored world location is inside the boundary, rendering the three-dimensional mirrored world portion at a first level of detail, and in case the mirrored world location is outside the boundary, rendering the three-dimensional mirrored world portion at a second level of detail, where the first level of detail has greater detail than the second level of detail.

In various embodiments of the method, rendering the three-dimensional mirrored world portion at the first level of detail includes texturing the mesh using the at least one 360-degree street view image, and in case the at least one 360-degree street view image includes two or more images, blending a seam between the two or more images.

In various embodiments of the method, rendering the three-dimensional mirrored world portion at the second level of detail includes accessing polygon data and height data in the two-dimensional physical world map data where the polygon data and the height data relate to buildings, rendering three-dimensional polyhedrons corresponding to the buildings based on the polygon data and the height data, and texturing sides of the polyhedrons corresponding to the 360-degree street view image based on the 360-degree street view image.

In various embodiments of the method, rendering the geotagged social media posts as three-dimensional objects in the mirrored world portion includes rendering at least one of a balloon object displaying a social media post, or a frame displaying one or more selected from a social media image, text, videos, and a collaborative drawing board.

In various embodiments of the method, rendering the geotagged social media posts as three-dimensional objects in the mirrored world portion includes rendering at least one of a stack of objects, a poster grid of objects, or a temporal transition of objects.

Further details and aspects of exemplary embodiments of the present disclosure are described in more detail below with reference to the appended figures.

BRIEF DESCRIPTION OF THE DRAWINGS

The above and other aspects and features of the present disclosure will become more apparent in view of the following detailed description when taken in conjunction with the accompanying drawings wherein like reference numerals identify similar or identical elements and.

DETAILED DESCRIPTION

Figure 1:
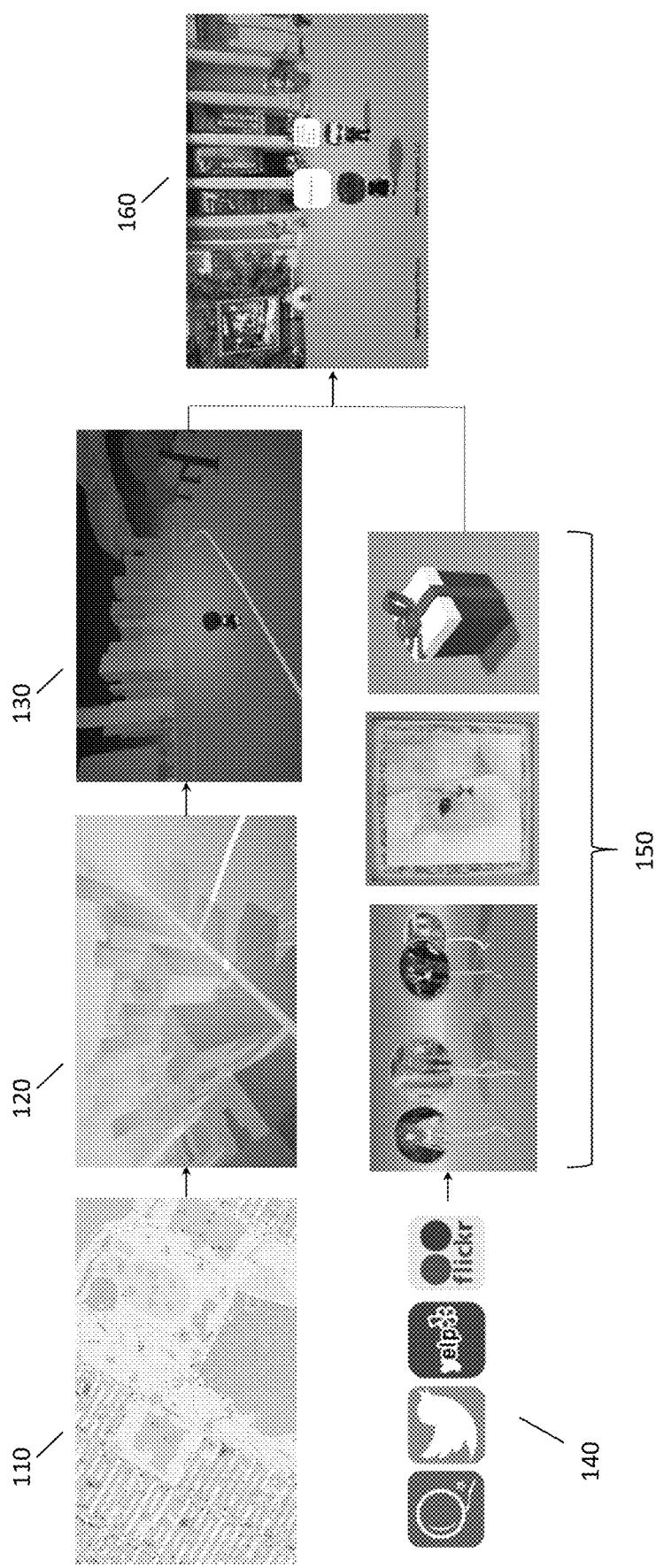
FIG. 1 is a diagram of an exemplary process of rendering a mirrored world, in accordance with aspects of the present disclosure.

The present disclosure relates to an interactive mixed reality social media platform for creating, sharing, and/or exploring geotagged information in a mirrored world. As will be explained below and in connection with the figures, the present disclosure provides systems and methods for constructing a live mirrored world with geotagged social media information. A real-time pipeline progressively renders an interactive mirrored world with three-dimensional (3D) buildings, internal user-generated content, and/or external geotagged social media. This mirrored world is interactive and allows users to see, chat, and collaborate with remote participants with the same spatial context in an immersive virtual environment. The live mirrored world may be referred to herein as "Geollery." As discussed in more detail below, Geollery can be implemented to include features such as progressively streamed meshes and view-dependent textures, virtual representations of social media, aggregation approaches, interactive capabilities, co-presence with virtual avatars, and/or collaboration modes.

Since the debut of Social Street View, several 3D social media platforms or prototypes have emerged. For example, High Fidelity, Facebook Spaces, and VR Chat allow people to communicate in virtual avatars like massively multiplayer games. These platforms have drawbacks. Social Street View presents a 3D social media platform with discrete panoramas. Social Street View has made some initial contributions in blending immersive street views with geotagged social media. Nevertheless, interaction is limited to street-level panoramas. Consequently, users can not virtually walk on the streets but can only teleport among the panoramas. VirtualOulu presents a design prototype which allows virtual avatars to walk in an offline city model, yet is not available throughout the world in real time. Such pre-designed 3D city models are not practical for deployment across larger areas. None of the existing systems allows the users to virtually "walk" and explore social media on an arbitrary street of a mirrored world that establishes the correspondence between the physical world and the virtual environment.

On the one hand, commercial products such as Google Earth offer world-scale, textured meshes at the aerial level, but the texture quality downgrades significantly for close-up views. Moreover, Google Earth does not allow users to freely walk in the virtual environments due to occlusion from the satellite imagery. On the other hand, classic high-fidelity approaches to modeling the 3D world have concentrated on generating 3D meshes using raw input data. For example, structure-frommotion (SfM) pipelines use hundreds or thousands of images in their 3D reconstruction systems to generate dense 3D meshes or point clouds. Web applications are generally limited to a few megabytes, which prevent them from downloading very dense 3D meshes or the data necessary to generate them. Visualizing dense point clouds on low-powered devices may require expensive server-side rendering techniques. Furthermore, generating 3D meshes or dense point clouds at a large scale requires significant amounts of data, which may not be fully available.

While offline reconstruction has been well studied and can yield very high-quality results for reconstructing small scenes, it is infeasible for applications with limited resources requiring world-scale virtual environments. For example, certain efforts have been made to reconstruct cities with the street view data and visualize the popularity and sentiments with virtual spots lights. However, such efforts require 113-457 minutes to reconstruct each city and lack the interactivity with online users. Despite the effectiveness of these offline systems, their data requirements and processing requirements make them unsuitable for mobile and web applications with processing and bandwidth constraints. For example, on one hand, the texturing of 3D buildings suffers from artifacts on complex geometries. On the other hand, pre-crafted digital cities or environments are usually unavailable in rural areas and require enormous amounts of collaborative work from crowd workers, artists, researchers, and city planners. Moreover, an entire digital city may include over 100 MB of data, which may be impractical for online deployment. Applications requiring an accurate representation of the physical world have thus far been limited to 2D maps, panoramic images, and handmade 3D models. Since creating 3D models is very labor-intensive and requires constant updating, 2D maps and panoramas are the primary sources of data available for constructing a large virtual representation of the physical world.

Google Street View has led the effort in creating client-side reconstruction applications by generating small depth maps for each of their street view images with most noise, pedestrians, and small vehicles filtered out. These depth maps, when compressed, are less than 10 kilobytes each, thus making them suitable for web applications. While depth information has been incorporated into Google Street View, they have only been used for positioning cursors and distorting street view images to make transitions. Google Street View does not provide the systems and methods disclosed herein for constructing a live mirrored world with geotagged social media information, including client-side reconstruction by fusing multiple panoramic depth maps of street view images.

Referring now to FIG. 1, there is shown a flow diagram of an exemplary high-level process of constructing a mirrored world. In accordance with aspects of the present disclosure, the disclosed system includes a data engine which accesses two-dimensional (2D) polygons and labels from a geographical data source, such as Google Maps or OpenStreetMap.org, and which accesses social media data from internal databases and/or external sources, such as Twitter, Yelp, and/or Flickr, among others.

First, the illustrated process accesses physical world geographical location information, such as latitude and longitude coordinates. Users have a choice of either sharing their device's current location or entering a desired location into an input box. Based on the geographical location, the system queries physical world 2D map tiles 110 and renders the ground plane of a mirrored world within a particular radius of the geographical location. The radius can be about 50 meters or another distance, which can be set by a user and/or can be determined based on hardware/computing capabilities. The ground plane visualizes roads, parks, waters, and buildings with a default or a user-selected color scheme.

Next, the process queries physical world 2D map data, such as data from Google Maps or OpenStreetMap.org, to gather information about buildings and terrains, such as height data. Based on the building and terrain information, 3D geometries are extruded in the mirrored world from the 2D polygons in the ground plane, and then shaded with the appropriate lighting and shadows to form buildings in the mirrored world 120. Then, the process renders a mirrored world within a frontal or a 360-degree field of view in real time and adds virtual avatars, clouds, trees, and/or day/night effects, among other things 130. In various embodiments, trees can be randomly generated in forests and in various locations.

The illustrated process also accesses geotagged social media from various sources 140 and renders in real time any social media posts that are geotagged within the frontal or 360-degree field of view. Social media posts can include, without limitation, images, text, video, audio, animations, and/or static or dynamic 3D meshes, among other things. In various embodiments, the geotagged social media can be presented in various forms, such as balloons, billboards, framed photos, and/or virtual gifts, among others 150. Although efforts have been made to visualize geotagged social media, such as TwitterStand and NewsStand where Twitter posts and news information are analyzed, streamed, and distributed on a map of the world as different types of icons, such efforts do not integrate social media into an interactive and immersive mirrored world. As other examples, efforts have explored ways to analyze and visualize geotagged information on 2D maps, including efforts to present a system for visualizing the heat maps of health reports on a map, efforts to present a geospatial visualization of Twitter messages with user-defined queries, time filters, spatial filters, and heap maps of tweet frequencies, efforts to present a social media analysis system with message plots on a map, topic filtering, and abnormality estimation charts, efforts to provide gridded heat maps, multivariate kernel methods, movement patterns, Reeb graphs, sentiment modeling, and flow visualizations of spatio-temporal patterns, and efforts to use domain-specific knowledge to analyze geotagged social media to improve emergency responses, assist disease control, understand the dynamics of neighborhoods and cities, and plan travel routes. However, none of those efforts offer a third-person or first-person walking experience in immersive virtual environments 160 as shown in FIG. 1. The high-level process of FIG. 1 is described in more detail later herein in connection with FIGS. 4-14.

Figure 2:
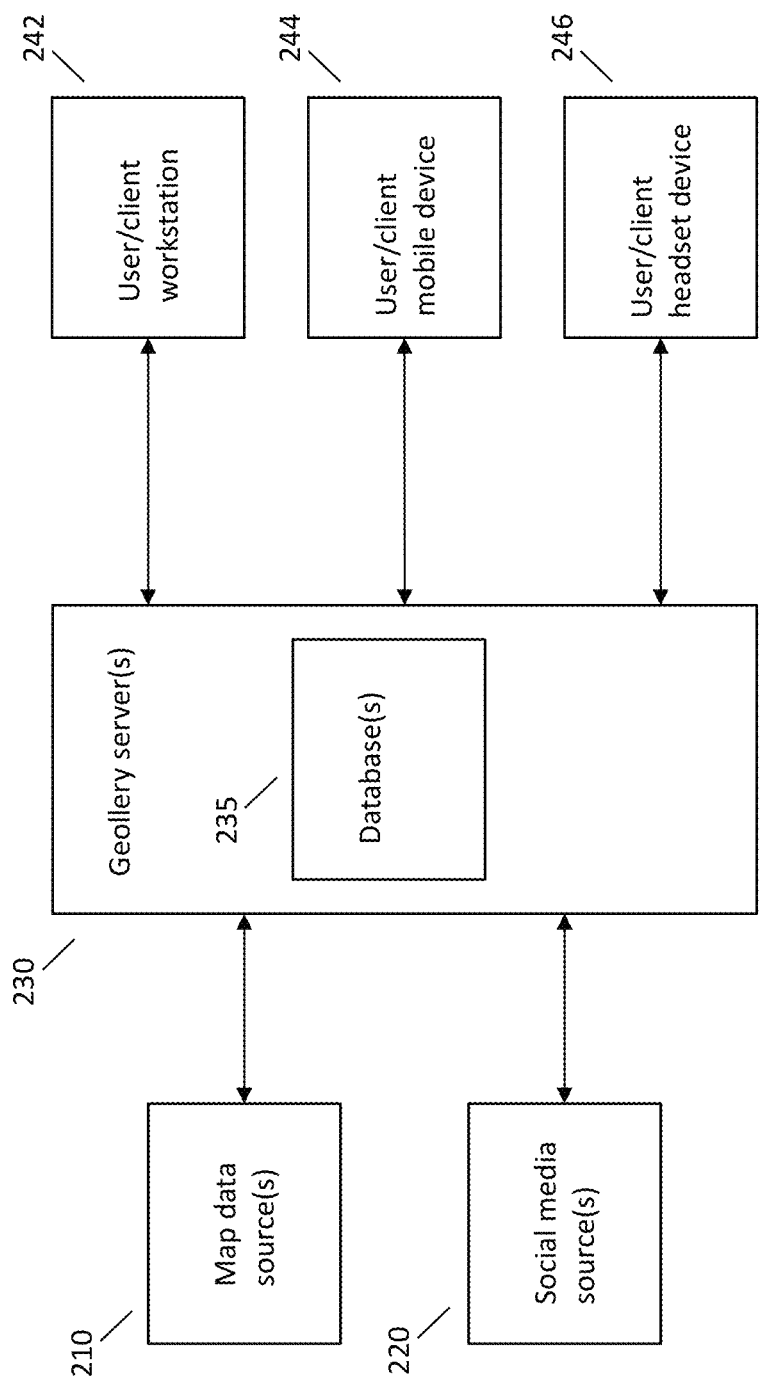
FIG. 2 is a block diagram of an exemplary environment for operating a mirrored world, in accordance with aspects of the present disclosure.

Referring now to FIG. 2, there is shown a block diagram of an exemplary networked environment for operating the disclosed systems and methods. The networked environment includes one or more map data sources 210, social media sources 220, Geollery server(s) 230, and user/client devices 242-246. The map data sources 210 include sources of physical world maps, geographical data, topographical data, structural data, depth maps, satellite images, and/or on-the-ground images, among other things. Examples of map data sources 210 include servers for Google Maps, Google Street View, and/or OpenStreetMap.org, among others. In various embodiments, the map data sources 210 can provide two-dimensional data and/or three-dimensional data. The social media sources 220 include sources of geotagged social media posts. Examples of social media sources 220 include servers for Twitter, Yelp, and/or Flickr, among others.

The Geollery servers 230 can be dedicated servers or servers in the cloud, such as servers provided by Amazon Web Services. The Geollery servers 230 communicate with the map data sources 210 and the social media sources 220 to request data from those sources. Data received from the map data sources 210 and the social media sources 220 are stored in one or more databases 235. The Geollery servers 230 also communicate with client devices 242-246. The main operation of the Geollery servers 230 is to process information from the map data sources 210 and the social media sources 220 into a form that is usable by the client devices 242-246 to generate a mirrored world with social media components in real time. A user device can be a workstation 242, such as a laptop or desktop computer, a mobile device 244, such as a tablet or smartphone, and/or a headset device 246, among other things.

The illustration of FIG. 2 is exemplary and, for simplicity, does not illustrate every component. As persons skilled in the art will recognize, the Geollery servers 230 include many more components in addition to the databases 235. Additionally, networks which convey communications between the devices are not illustrated. Variations of the configuration of FIG. 2 are contemplated to be within the scope of the present disclosure. For example, in various embodiments, a user device 242-246 can communicate directly with a map data source 210 and/or a social media source 220.

Figure 3:
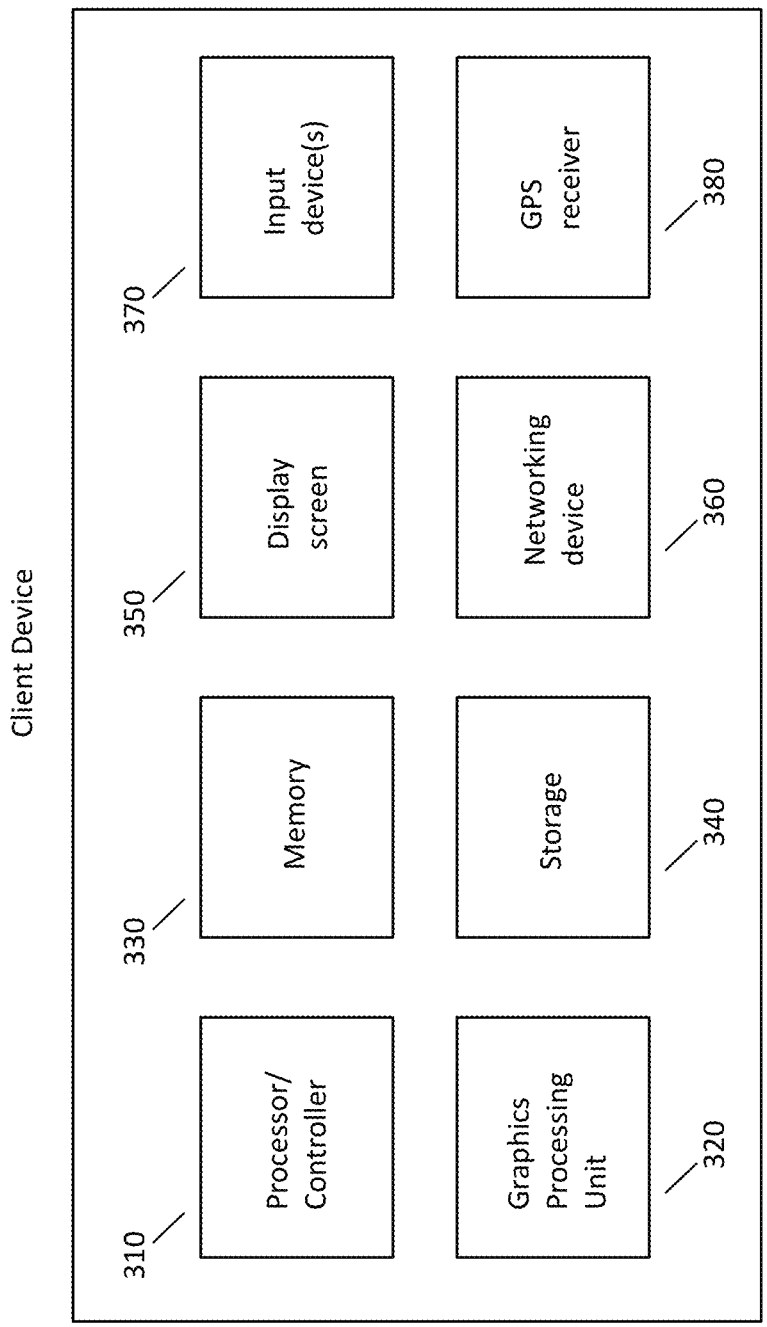
FIG. 3 is a block diagram of exemplary components of a client device, in accordance with aspects of the present disclosure.

FIG. 3 is a block diagram of exemplary components of a client device. The illustrated client device includes a processor or controller 310, a graphics processing unit (GPU) 320, memory 330, and storage 340. The memory 330 can be random access memory and can store instructions which implement various operations according to the present disclosure, such as various operations of FIG. 1 for rendering a mirrored world. The operations are carried out by the processor/controller 310 and/or the GPU 320 executing the instructions. As persons skilled in the art will recognize, certain instructions are executed by the processor/controller 310 while certain instructions are executed by the GPU 320. In various embodiments, the processor/controller 310 can be an Intel or AMD central processing unit, a Qualcomm Snapdragon processor, a digital processing unit, or another type of processor or controller. In various embodiments, the GPU 320 can be an Intel, Nvidia, or AMD GPU. The operations carried out by the instructions access and use information/data stored in the storage 340. For example, the information/data stored in the storage 340 can include map data and social media data. In various embodiments, the storage 340 can include a flash drive, a solid state drive, and/or a magnetic disk drive, among other storage devices.

With continuing reference to FIG. 3, the client device also includes a display screen 350, input devices 370, a networking device 360, and a GPS receiver 380. In various embodiments, the display screen 350 and the input device(s) 370 can be integral with the client device or can be separate from the client device. The display screen 350 operates to present the mirrored world, and the input device(s) 370 operate to permit a user to interact with the mirrored world. In various embodiments, the input device(s) 370 can include a touch screen, a keyboard, a mouse, a game controller, and/or a motion sensor that provides multiple degrees-of-freedom, among other input devices. The networking device 360 can be a wired or wireless networking device that communicates using Wi-Fi, Bluetooth, Ethernet, or another networking technology. The networking device 360 operates to communicate with the Geollery servers and/or the data sources (FIG. 2). The GPS receiver 380 allows the client device to determine its geographical location in the physical world so that the client device can render a mirrored world location corresponding to the physical world geographical location.

The illustration of FIG. 3 is exemplary and certain components are not illustrated for simplicity. For example, the memory 330 and the storage 340 can include software such as operating system and Web browser software, among other things. Such components will be recognized by persons skilled in the art.

Referring to FIGS. 2 and 3, the disclosed system can be implemented in various ways. The Geollery servers 230 can be implemented using a web server powered by Apache and PHP and using a SQL database. In various embodiments, the Geollery servers 230 can use a B+ tree to index geotagged information for querying in real time. The client devices 242-246 can implement rendering using Three.js (www-.threejs.org), which is a cross-browser GPU-accelerated JavaScript library that utilizes WebGL to allow creation of 3D animations as part of a website without relying on browser plugins.

In various embodiments, the client devices 242-246 can use WebGL to enable the mirrored world via modern browsers on a desktop 242, a mobile phone 244, and/or a head-mounted display 246. As persons skilled in the art will recognize, WebGL enables rendering of interactive 2D and 3D graphics within a web browser without use of plug-ins. In various embodiments, the user client devices 242-246 can connect to the Geollery servers 230 via HTML5 Web Sockets, which enables a full-duplex communication channel that operates through a single socket over the Web and thereby allows real-time communication and collaboration with other nearby participants.

In various embodiments, the Geollery servers 230 acquire geotagged social media by querying internal databases 235 and/or external social media servers/sources 220 for geotagged social media. For internal database queries, a PHP server can retrieve social media from an internal MySQL database 235. For external queries to social media sources 220, the Geollery servers 230 can use public APIs, such as those documented by Twitter and Yelp, to acquire the latest public social media near an avatar's location in mirrored world. In various embodiments, the Geollery servers 230 can parses the social media returned by each API and pass it to the client 242-246. In various embodiments, Flickr photo metadata can be imported into an internal MySQL database 235. In various embodiments, the process accesses only social media the requesting user is permitted to view.

The client devices 242-246 can uses POST requests to gather social media from the Geollery servers 230 within a specific radius of the avatar's location. The list of social media can be returned to the client 242-246 as a JSON encoded array of metadata including the location, author, image URL, and/or the text caption of each social media post. For each form of social media, 3D models are generated on the client 242-246 to represent the social media in the mirrored world. In various embodiments, the client devices 242-246 can directly request social media from the social media sources 220 using public APIs, in the same manner as or in place of the Geollery servers 230.

Figure 4:
FIG. 4 is a diagram of an exemplary mirrored world portion, in accordance with aspects of the present disclosure.

Referring now to FIG. 4, there is shown an exemplary rendered field of view of a mirrored world. A user's virtual avatar can be rendered in a location in the mirrored world corresponding to the user's geographical location in the physical world or corresponding to a desired geographical location. Users have a choice of either sharing their device's current physical world location or entering a desired location into an input box. As the user virtually walks on the street in the mirrored world, the Geollery server(s) stream additional data to the client device for rendering further portions of the mirrored world. Thus, rather than construct an entire city or geography, the present disclosure leverages a progressive approach to partially build the mirrored world in a field of view of a location or in a region surrounding a location.

Figure 5:
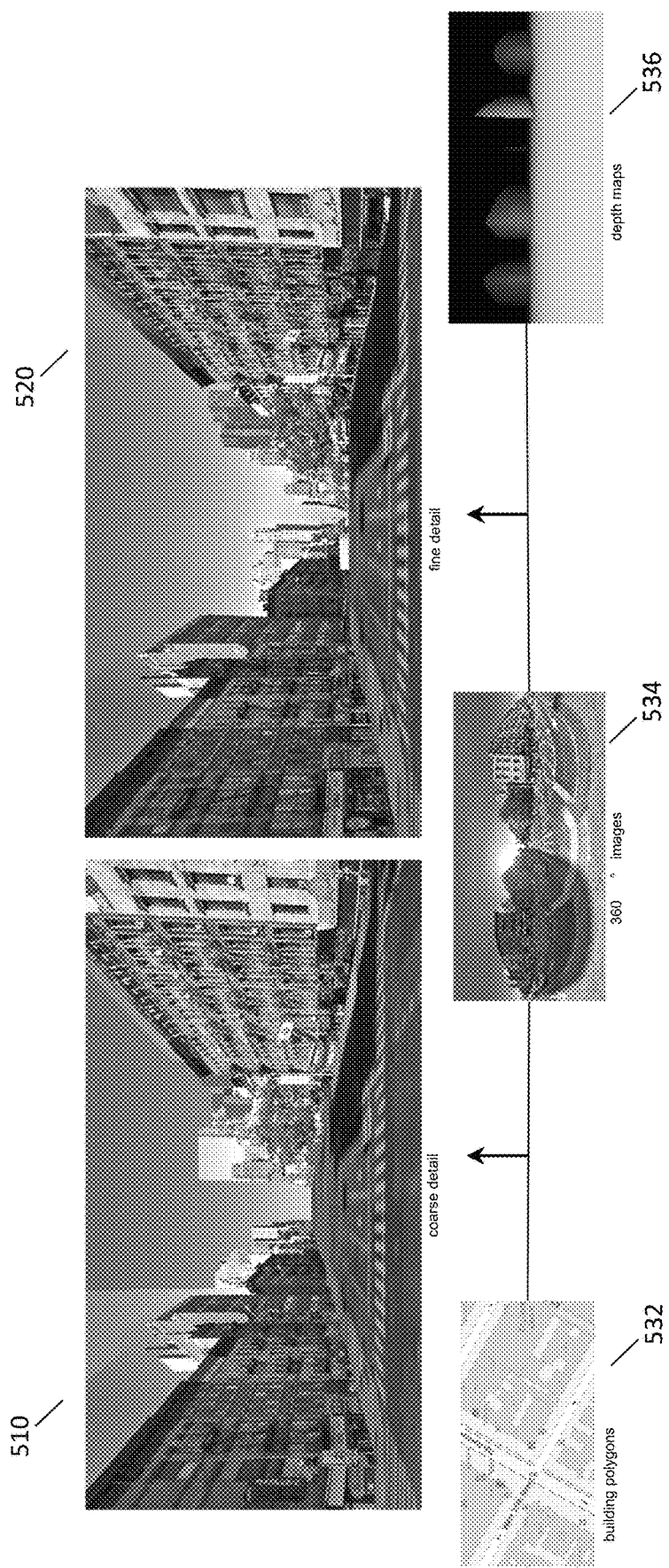
FIG. 5 is a diagram of rendering a mirrored world portion in varying levels of detail based on physical world map data, in accordance with aspects of the present disclosure.

In accordance with aspects of the present disclosure, an interactive pipeline of fusing 360-degree images can be used to render the mirrored world at two levels of detail. FIG. 5 shows a diagram of exemplary approaches to providing a coarse level of detail and a fine level of detail. For far away views, a coarse level of detail 510 can be provided by creating extruded boxes with building metadata from OpenStreetMap and by texturing the meshes with street view panoramas. For close-up views, a fine level of detail 520 can be provided by incorporating multiple Google Street View panoramas and depth data to reconstruct textured meshes directly on the client device GPU. A web-based architecture can be deployed across the Geollery server(s) and the client devices to stream, cache, reconstruct, and render the mirrored world in real time.

The coarse level of detail 510 uses 2D map data 532 and street view images 534. The present disclosure circumvents the offline reconstruction or manufacture of a digital city or environment. In various embodiments, Geollery server(s) progressively stream open 2D maps 532 to the client devices. With 2D polygons and labels 532, the client device extrudes and textures geometries on demand in real time using street view data, thereby enabling visualization of geo-relevant social media within their spatial context and allowing user interaction in a mirrored world. For coarse detail 510, the disclosed technology blends images for projective texture mapping onto the extruded geometries.

The fine level of detail 520 uses street view images 534 and depth information 536. Existing efforts to construct small scenes have focused on 3D reconstruction based on structure-frommotion techniques using multiview photographs or RGB video streams. And existing efforts to construct large-scale environments spanning entire rooms or buildings have become possible due to low-cost depth cameras such as Microsoft Kinect and Microsoft HoloLens. Outdoor reconstruction using tablets has also been shown to run at near interactive frame rates given continuous updates from a depth camera. Based on advances of GPU technologies, real-time reconstruction from multiview stereo cameras has also become possible. While such real-time approaches to reconstruction from depth camera video have provided effective results, they require a continuous source of depth information provided by depth cameras, which may not be readily available to end-users. As explained in more detail below, the disclosed systems and methods use pre-captured, moderately sparse, depth maps 536 and 360-degree images/panoramic images 534 to reconstruct large scenes with fine detail 520. In various embodiments, the disclosed pipeline focuses on client-side reconstruction using pre-processed depth images 536 as opposed to the raw depth video streams of existing efforts, thereby making the disclosed technology feasible for real-time 3D web applications.

Both the coarse level of detail 510 and the fine level of detail 520 use 360-degree street images or panoramic street images 534. Existing city-level reconstruction approaches have focused on using satellite and aerial imagery as reconstruction from unstructured photo collections, which requires massive amounts of data and computational power and limits their applicability to web-based applications. Other existing approaches have used the availability of 360-degree images from Google Street View, which has become a data source for high-resolution large-scale outdoor reconstruction. Such efforts have demonstrated a city-level reconstruction of Pittsburg by using 4,799 images with a Structure-from-Motion (SfM) pipeline. However, such efforts using SfM pipelines to reconstruct large city spaces require multiple images to detect motion and high demands of processing power to generate the resulting point clouds, which may be impractical and infeasible for deployment on end-user devices. As explained in more detail below, the present disclosure presents real-time reconstruction approaches requiring only a small number of high-quality 360-degree images 534 and metadata 532 from map data sources such as Google Street View and OpenStreetMap. Using the disclosed interactive reconstruction approach with low-bandwidth requirements, the disclosed technology is able to access arbitrary locations of a mirrored world in real time wherever the data is available in the map data sources, without the need for continuous updating of server data. While some server-side pre-processing is involved, as explained below, the disclosed technology does not require demanding server-side pre-processing.

Figure 6:
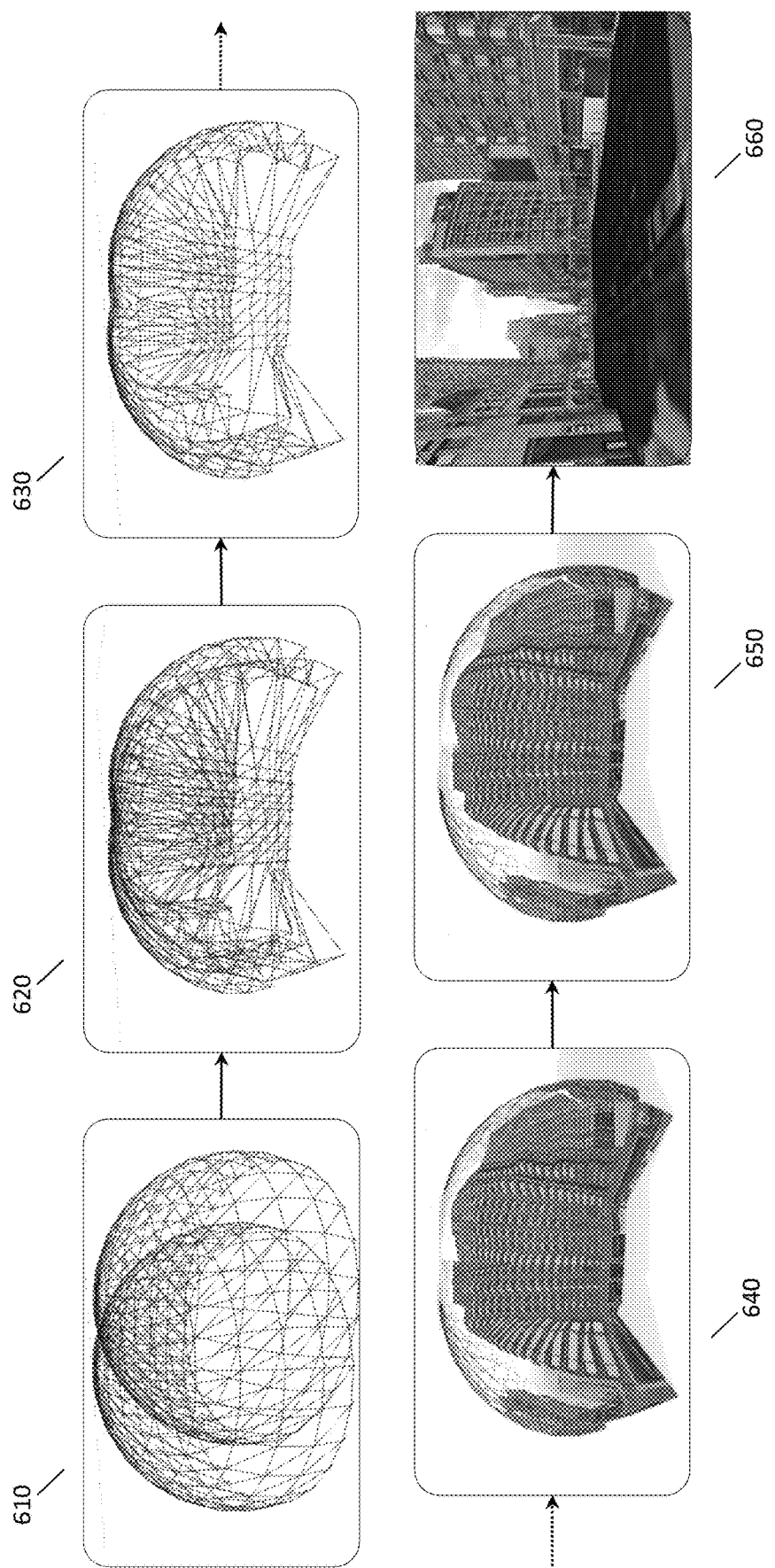
FIG. 6 is a diagram of an exemplary process of fusing multiple street-view images, in accordance with aspects of the present disclosure.

FIG. 6 is a diagram of an exemplary high-level process pipeline of fusing two 360-degree images to provide a fine level of detail. In various embodiments, the illustrated process of FIG. 6 is performed by a client device which receives 360-degree street images from a Geollery server. The process starts by generating spherical geometries to represent the 360-degree images 610. In FIG. 6, the number of segments of each sphere is greatly reduced for illustrative purposes and for visualizing the geometries clearly. Next, for vertex shading, the process corrects the depth value for each vertex by sampling the depth maps with spherical coordinates 620. Then, for fragment shading, the process discards the pixels in the intersection of the adjacent geometries 630. Next, the process textures individual spheres with the corresponding 360-degree images 640, which may leave a visible seam. Then, the process textures the spheres with a weighted average according to the position to the camera, which yields a smoother result 650. Next, the process interactively textures the ground plane and applies Gaussian filters in occluded regions 660. The high-level process of FIG. 6 is explained in more detail below.

As mentioned above, some server-side pre-processing is involved. Given a physical world geographical location, such as a pair of longitude and latitude coordinates, the Geollery server accesses street view images and depth information from a map data source, such as Google Street View, in JavaScript. In various embodiments, the raw images are fetched as 512×512 pixel JPEG tiles, which can be decoded and stitched together into five different levels of detail as shown in Table 1 below. For mobile user devices with lower bandwidth and smaller screens, the Geollery server can provide level 2 street view images by default, while for user workstations, the Geollery server can provide level 3 or 4 to achieve higher quality with acceptable latency. In various embodiments, users have the option to select custom levels of detail.

TABLE 1

| Level | Pixels | Resolution | Number of tiles | File size |
| --- | --- | --- | --- | --- |
| 5 | 134.2M | 16384 × 8192 | 32 × 16 | ~5M |
| 4 | 33.5M | 8192 × 4096 | 16 × 8 | ~2M |
| 3 | 8.4M | 4096 × 2048 | 8 × 4 | ~800K |
| 2 | 2.1M | 2048 × 1024 | 4 × 2 | ~300K |
| 1 | 0.5M | 1024 × 512 | 2 × 1 | ~90K |

With regard to the first block 610 of FIG. 6, the client device generates a spherical geometry with a fixed radius. In various embodiments, the radius can be 1000 m or another depth. In various embodiments, the radius can be the farthest depth to prevent the geometry from being culled when navigating in the scene. In various embodiments, the number of width and height segments of the sphere is chosen based on the resolution of the depth map, with one additional height segment for the top and bottom vertices added for the sphere. By matching the resolution of the depth map with the number of width and height segments of the sphere, each vertex of the sphere geometry, except the top and bottom, corresponds to exactly one pixel of the depth map. For example, for a 512 by 256 depth map, the corresponding sphere segments would include 512 width segments and 257 height segments. Such a sphere would therefore have 512×256+2=131,074 vertices and 2×512×256=262,144 faces.

Regarding the vertex shading block 620, to achieve interactive frame rates, the disclosed technology can use a custom vertex shader running on the GPU to determine the exact positions of the sphere vertices to create a convincing geometry. In the vertex shader, the process computes the spherical coordinates of each vertex in the sphere geometry, $(\rho_0, \theta_0, \phi_0)$, by calculating the directional vector $d=v-s$ from the location of the street view cameras to the vertex v. Here, $\rho_0$ is the initial radius of the sphere while $(\theta_0, \phi_0)$ are the converted coordinates of d on the spherical surfaces. The process then looks up the correct depth value $\rho_1$ by sampling the depth map at $(\theta_0, \phi_0)$. Finally, the process moves each vertex to the correct spherical position $(\rho_1, \theta_0, \phi_0)$ by setting its Cartesian position in world coordinates to $$\left(\frac{p_1}{p_0}\right)d + s.$$

With a vertex shader running on a GPU, the computations are executed in parallel and in real time.

With regard to depth connection and intersection removal 620, 630, the process generates one geometry for each street view image. To encapsulate a wider area than what is provided by a single street view image, the process aims to seamlessly fuse the corrected spherical geometries generated along each street. When positioning the sphere geometries based on the geographic coordinates of their associated street views, large intersections/overlapping may be present between adjacent geometries as shown in block 610. Ideally, from any point within each sphere, the disclosed technology enables a view of the farthest sphere. Accordingly, the process discards the intersection/overlap between adjacent geometries as shown in blocks 620, 630. To implement this, the process computes whether each pixel of each geometry intersects with another geometry at runtime. For example, based on the metadata from the map data source, such as Google Street View, the process queries and passes the locations for adjacent street view images to the fragment shader. For each pixel located at p, the process computes the distance $d_0=|p-v_0|$ from the current street view $v_0$ to p and the distance $d_1=|p-v_1|$ from adjacent street views $v_1$ to p. If the adjacent street views are closer in distance to the current pixel than the current street view, i.e., $d_1<d_0$, the process discards the current pixel. As shown in blocks 620, 630 of FIG. 6, this process discards the interior of the intersections of the two geometries while preserving the remainder. The particular technique described above is exemplary, and other techniques for discarding the interior of the intersections of two or more geometries are contemplated to be within the scope of the present disclosure.

Figure 7:
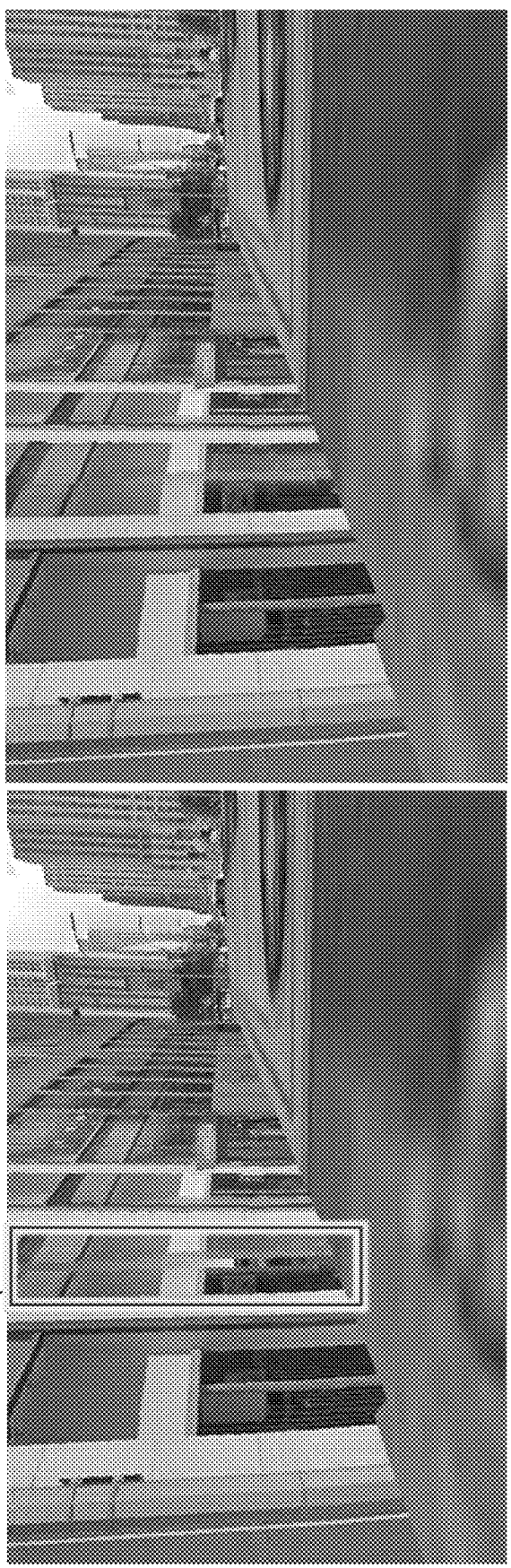
FIG. 7 is a diagram of a result of applying an exemplary technique of aligning two street-view images, in accordance with aspects of the present disclosure.

When fusing the geometries by discarding the intersections, an imperfect correspondence between the depth maps of adjacent street views can create visible gaps at the seams where two spheres intersect. An example is shown by the left-side image of FIG. 7, with the gap 710 highlighted by a box. To eliminate or mitigate these gaps, the process translates each vertex $v_0$ near the gaps by a vector $\delta_0=\hat{v}_0-v_0$ from the initial vertex position $v_0$ to a position $\hat{v}_0$ suggested by the other depth map, and scaled by a factor. In various embodiments, the scaling factor can be 0.7 or can be another value. The right-side image of FIG. 7 shows a result of performing such technique on the left-side image of FIG. 7, where the gap has been mitigated or eliminated. While this technique eliminates many gaps caused by erroneous depth map in real time, it may not eliminate very large gaps and does not fuse the texture information, which is discuss next. The technique described above for eliminating or mitigating gaps in fused geometries is exemplary, and other techniques for eliminating or mitigating gaps in fused geometries are contemplated to be within the scope of the present disclosure.

Referring again to FIG. 6, with regard to texturing individual spheres 640, the process textures each individual geometry by sampling from the corresponding 360-degree street image with the spherical coordinates at each pixel. The result includes various imperfections, however, such as misalignment between adjacent geometries, distorted projection on the ground, and pixelation in occluded regions. In accordance with aspects of the present disclosure, various techniques are described to mitigate these artifacts in real time.

One technique relates to the weighted averaging/blending process 650 of FIG. 6. Street view images generally do not line up perfectly at the edges where the geometries meet, as a result of poor calibrations of the camera positions and/or inaccurate depth estimation. Certain techniques for addressing edge issues include optical flow over a mesh and Poisson blending, but such approaches may not be practical for certain real-time systems. The present disclosure provides a technique of blending the textures of the adjacent two street view geometries at the seam with weighted alpha blending 650. For each pixel, the process first computes its distance to each of the two adjacent street views, as distances $d_0$ and $d_1$. The process next samples the textures from the two 360-degree images as $c_0$ and $c_1$. Then, the process colors the pixels near the seams with the weighted average of $$0.5 + \frac{d_1 - d_0}{2\delta} c_0 + 0.5 - \frac{d_1 - d_0}{2\delta} c_1.$$

Figure 8:
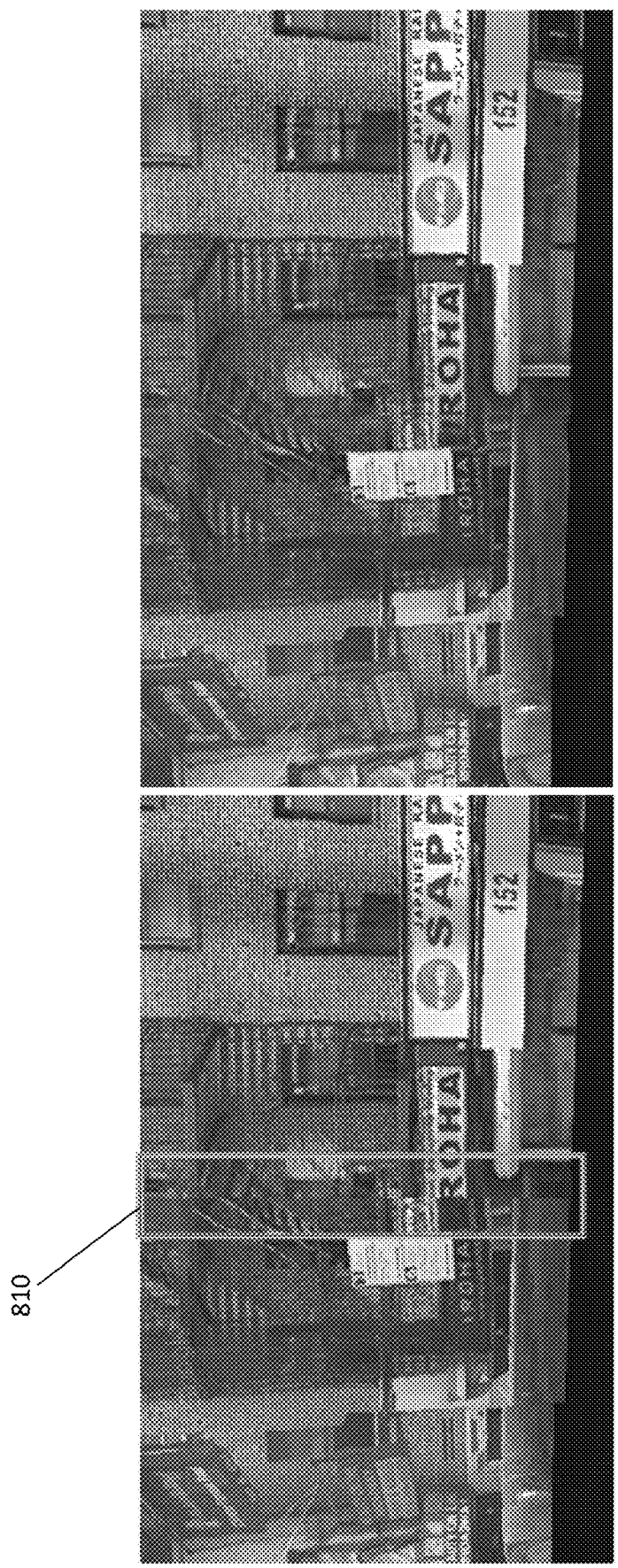
FIG. 8 is a diagram of a result of applying an exemplary technique for blending a seam between two street-view images, in accordance with aspects of the present disclosure.

FIG. 8 illustrates an example where the left-side image shows fused geometries without any seam processing and the right-side image shows fused geometries with the weight alpha seam blending described above. By blending the pixels near the gap 810 where the two geometries meet, the seams become much less distinguishable, as shown by the right-side image of FIG. 8. In various embodiments, the weighted alpha blending can be performed in a fragment shader.

Referring back to FIG. 6, the final part 660 of the illustrated pipeline involves texturing the ground plane and applying Gaussian filters in occluded regions.

Figure 9:
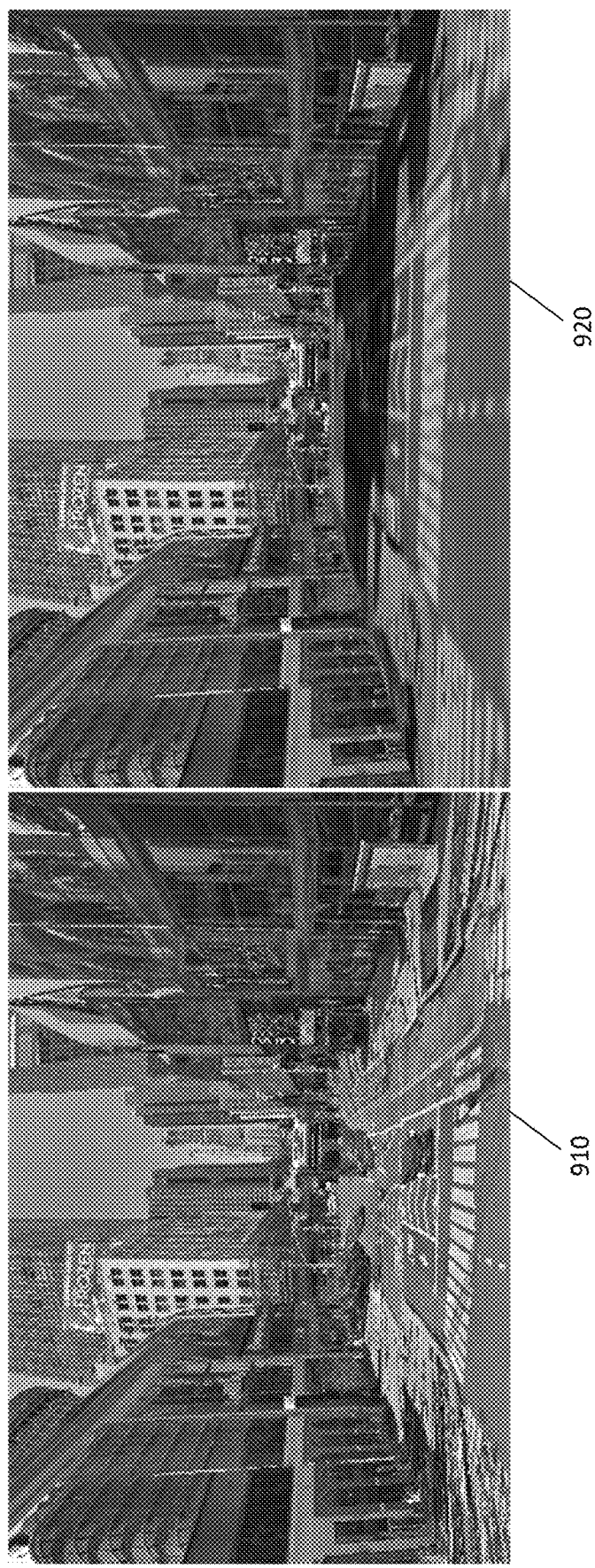
FIG. 9 is a diagram of a result of applying an exemplary ground level texture, in accordance with aspects of the present disclosure.
Figure 10:
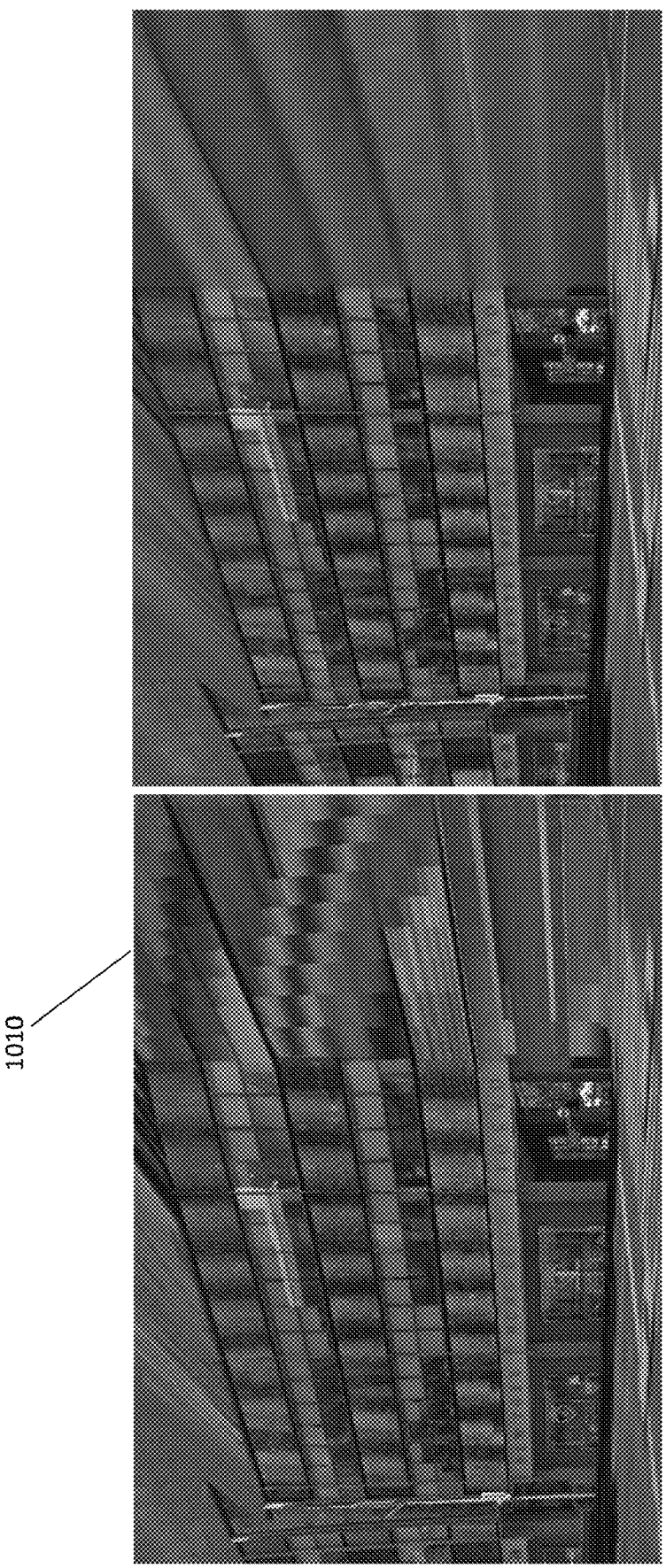
FIG. 10 is a diagram of a result of applying an exemplary occluded portion texture, in accordance with aspects of the present disclosure.

With regard to texturing the ground plane, it is notable that in dense urban areas, cars and pedestrians often appear in street view images. In most cases, pedestrians are projected to the ground when incorporating Google depth maps. While this projection is appropriate when viewed from the position the original street view was captured, it leads to distortions when viewed from other perspectives. In accordance with aspects of the present disclosure, to eliminate distorted cars and pedestrians, the present disclosure overlays Google Maps satellite images, where available, in texturing the ground plane. FIG. 9 illustrates an example of such technique, where the left-side image includes the ground plane 910 from the street view images and the right-side image includes a ground plane 920 textured using satellite images. As shown in FIG. 9, texturing the ground plane with satellite images results in a better visual appearance. This technique, however, requires the availability of lower resolution external satellite images. In situations where such satellite images are not available, the ground plane can be textured using other techniques, such as image in-painting or machine learning that recognizes and eliminates the artifacts on the ground.

With regard to applying Gaussian filters in occluded regions, pixelation of street view images on the geometry occurs when portions of the real geometry are occluded from the street view image. Stretching, distortion, and pixelation may occur when portions of the real geometry are occluded from the 360-degree textures. For example, as illustrated in the left-side image of FIG. 10, when a camera is positioned in the center of two street views taken at very different distances from a building, the sides of the building are not observed by either of the two 360-degree images. Hence, the large occluded areas sample from very few pixels and result in artifacts 1010. To detect the occluded region 1010, the disclosed process first samples the depth map in the vertex shader four additional times to sample the depth of the adjacent vertices. The artifacts occur primarily when the depth drops off at the edge of the building. Therefore, if the depth of neighboring vertices differs drastically from the current vertex, the current vertex can be marked as occluded. For occluded pixels, the disclosed process can apply a 5×5 Gaussian filter with a standard deviation of 7.0 in the fragment shader on the GPU to smooth the occluded pixels. The particular configuration of the filter is exemplary, and variations are contemplated. Additionally, other techniques for addressing occluded pixels are contemplated to be within the scope of the present disclosure.

The techniques described above for fusing two 360-degree images can be applied in other situations. For example, the techniques can be extended to fusing more than two 360-degree images. Additionally, the techniques can be applied to fusing two or more panoramic images that each cover less than 360-degrees. Other variations and combinations of the disclosed technology are contemplated.

Accordingly, described above are processes and techniques for rendering a mirrored world in a fine level of detail. As described above, rendering in a fine level of detail can be used for close-up views, such as for situations when an avatar is within a spherical geometry. When an avatar moves outside the boundary of a spherical geometry mesh, the outer face of the sphere-based geometries becomes visible in that situation, and a different real-time approach is used to render in a coarse level of detail.

In accordance with aspects of the present disclosure, reconstructing a bird's-eye view in real time involves fusing 360-degree images at a larger scale. Accordingly, multiple streets views and larger-scale geometries are used. For reconstructing a bird's-eye view in real time, the present disclosure creates building geometries based on 2D map data rather than localized depth maps from each street view, and projects street view images onto the building geometries in a fragment shader running on a GPU. Such an approach for far-away view does not use depth maps to generate building geometries since they are unable to capture all faces of a building.

As described above in connection with FIG. 1, the 2D map data can be obtained from a map data source, such as OpenStreetMap, which provides 2D polygons for buildings. In urban areas such as New York City, the map data sources often provide 2D building polygons with useful metadata such as the building height in meters and/or the number of floors for each building. To convert these 2D polygons into 3D polyhedra, the disclosed process extrudes them to the correct height based on the information provided in the metadata. For instances where metadata is not available, the buildings can be extruded to a default height or number of stories, such as 16 meters or 4-stories.

Next, the disclosed process textures the 3D polyhedron geometries in real-time by using a single street view image to maintain real-time performance, preserve high-quality textures, and minimize image artifacts. While previous approaches have generated 3D textured building geometries with high quality by incorporating multiple street view images, such approaches have been offline systems that require significant pre-processing time and use hundreds of low-resolution street view images. While the disclosed process can operate using a single street view image to render a coarse level of quality, in various embodiments, more than one street view image can be used as well depending on the client device's computational resources.

The disclose process projects the street view onto building walls by sampling the nearest street view image from a fragment shader. In the fragment shader, the directional vector d=p−s from the position of the street view s to each pixel p is calculated. Then, the process calculates the direction of the vector in spherical coordinates ($\rho_0$, $\theta_0$, $\phi_0$) using the transformation $$(\rho_0, \theta_0, \phi_0) = \left(|d|, \arcsin\left(\frac{d \cdot y}{|d|}\right), \arctan 2(d \cdot z, d \cdot x)\right).$$

Next, the process samples the ($\theta_0$, $\phi_0$) point of the street view image to color each pixel of the building. To avoid texturing sides of buildings which are occluded from the street view, the fragment shader can detect whether individual faces of the geometry are occluded in the street view images. To accomplish this, the process compares the normal vector n with the previous vector pointing to the building face d. If $\langle n, -d \rangle$ <0, or equivalently $\langle n, d \rangle$ >0, the process can conclude that the angle between n and −d is greater than 90 degrees so that the current face is occluded in the street view images. Instead of using the street view images, the occluded face can be textured with a solid color.

Figure 11:
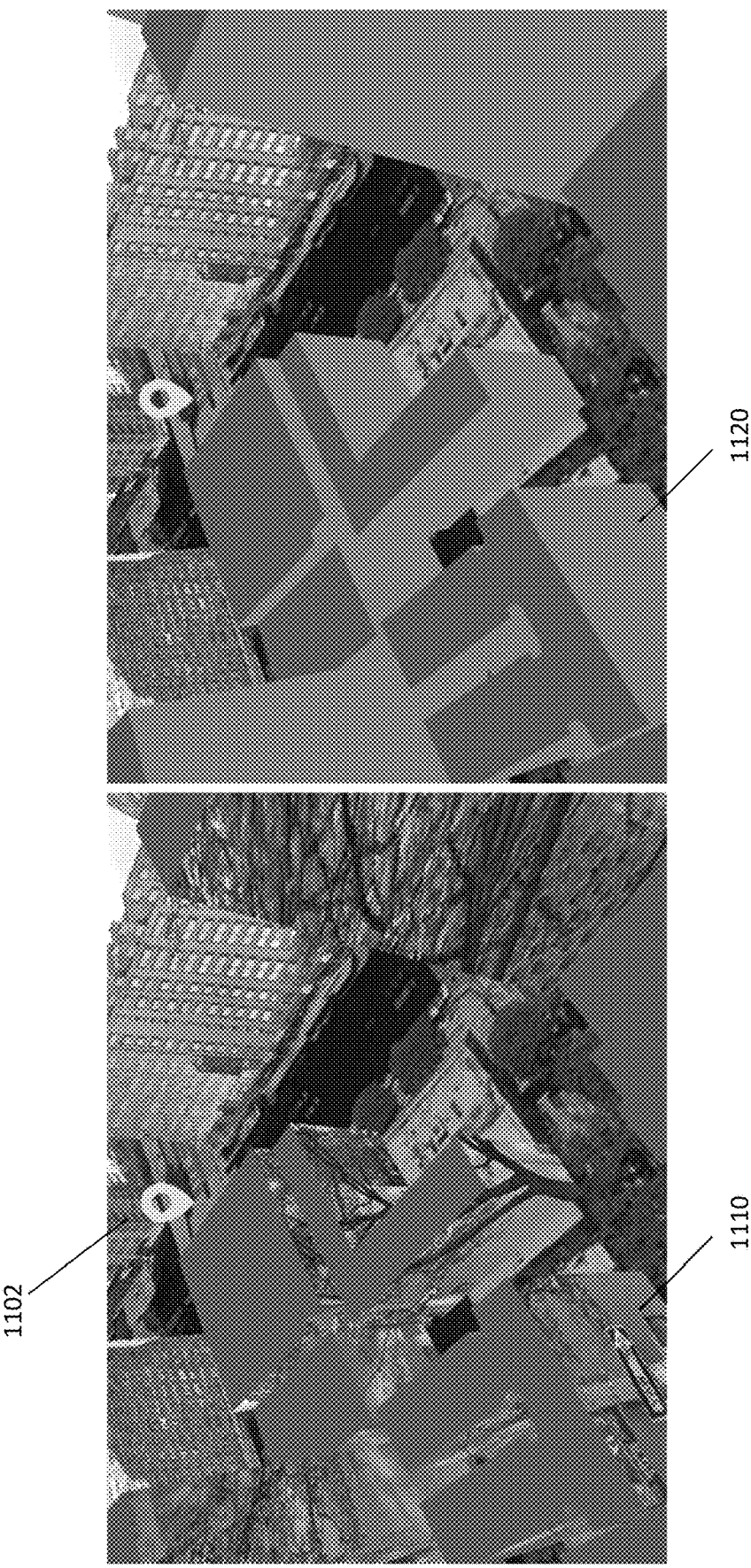
FIG. 11 is a diagram of a result of applying an exemplary occlusion detection technique, in accordance with aspects of the present disclosure.

An example is shown in FIG. 11, where the left-side image shows the result of texturing multiple buildings with a single 360-degree image taken at the location of the illustrated marker 1102. In the left-side image, when viewed from afar, projecting a street view image onto every side of every building will result in occluded areas being textured with inappropriate projections 1110. In the right-side image, an occlusion test performed in the fragment shader determines which building faces are occluded and only projects 360-degree images onto the visible surfaces. The occluded surfaces, such as rooftops and occluded walled, are textured with solid colors 1120.

Accordingly, described above are processes and techniques for rendering a mirrored world in fine detail for close-up views and rendering in coarse-detail for far away views. Rendering quality and resource demands can be balanced in different ways depending on the particular application and resources. In various embodiments, the process of selecting meshes and textures can consider the tradeoff between the processing speed and the visual appearance. In various embodiments, to accommodate a vast array of potential end-users with different computing resources, the present disclosure provides a progressive approach to only reconstruct nearby building geometries. This progressive approach allows a client device to create buildings in real time as needed and circumvents pre-constructed models so that the disclosed technology can be used interactively at any location where 2D building data are available. In previous systems such as Social Street View, users cannot fully interact and have to "teleport" to the other locations. In contrast, the disclosed technology achieves six degrees of freedom in movement. To achieve such movement, the disclosed technology progressively streams data from a map data source, such as OpenStreetMap, to build 3D meshes in real time.

In accordance with aspects of the present disclosure, for both coarse level of detail and fine level of detail, real-world phenomena such as day and night transitions and changing seasons can be implemented to make the mirrored worlds more realistic. Persons skilled in the art will recognize the ways to implement day/night transitions which adjust the lighting and sky based on the local time of the physical world geographical location corresponding to the avatar's mirrored world position.

Figure 12:
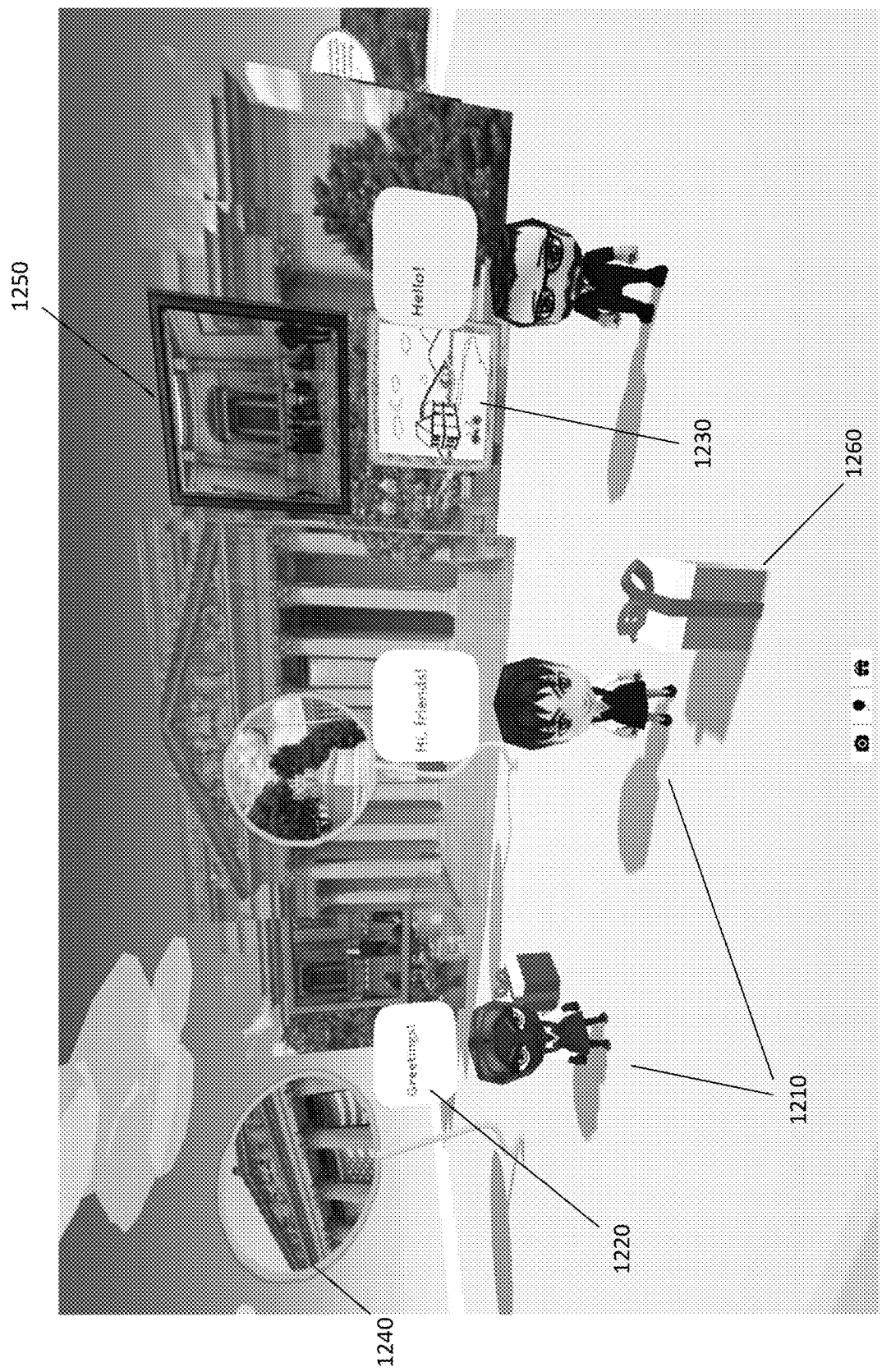
FIG. 12 is a diagram of an exemplary mirrored world portion having objects corresponding to social media posts, in accordance with aspects of the present disclosure.

In accordance with aspects of the present disclosure, and as mentioned above, the mirrored world is interactive and is populated with avatars and geotagged social media posts. Users can see nearby friends as virtual avatars, chat with friends, and paint street art collaboratively on the virtual building walls. FIG. 12 is an example of a view of such a mirrored world. Geotagged social media posts are presented in the mirrored world as objects such as billboards, balloons, framed photography, and/or 3D models such as gift boxes.

First-time users are asked to select a 3D avatar from a collection of pre-made models. In various embodiments, these models are stored in glTF format for efficient transmission and loading in the WebGL context. After selecting an avatar, users can use a keyboard or a panning gesture on a mobile device to virtually walk in the mirrored world. When two participants 1210 virtually meet with each other in the mirrored world, Geollery servers allow them to chat with each other in the form of text bubbles 1220. Users can click on/select other avatars to send private chat messages or click/select their own avatar to send public chat messages. In various embodiments, the Geollery servers enable two or more users to share a single whiteboard 1230, draw on it, and add pictures or text, via Web Sockets. The Geollery servers update drawings on nearby users' canvases after every edit, thereby enabling real-time collaboration.

Geotagged social media posts are presented in the mirrored world as objects such as billboards, balloons 1240, framed photography 1250, and/or 3D models such as gift boxes 1260. In various embodiments, the Geollery servers allow users to create billboards, balloons, and/or gift boxes at their avatar's location by uploading photos or text messages.

Figure 13:
FIG. 13 is a diagram of another exemplary mirrored world portion having objects corresponding to social media posts, in accordance with aspects of the present disclosure.

Billboards can be used to show thumbnails of geotagged images or text. In various embodiments, different levels of detail for thumbnails can be available, such as 642, 1282, 2562, and 5122 pixels, and progressively load higher resolution thumbnails as users approach different billboards. When users hover over a billboard, the billboard can reveal associated text captions. In various embodiments, the text captions can be truncated to a particular number of lines, such as four lines. When users click on a billboard, a window can appear with detail including the complete text caption, the number of likes, and/or any user comments. An example of a billboard is shown in FIG. 13.

Balloons 1240 display social media posts to attract users' attention and sustain their interest in nearby social media. In various embodiments, the border colors of balloons can be used to categorize the social media based on the text of each social media post.

In various embodiments, the Geollery servers can allow users to place framed photos or public whiteboards 1230 on building walls. Creators of street art can allow nearby users to collaborate in drawing doodles or writing text on the whiteboard. When creating whiteboards 1230, users also have the option of selecting from multiple sizes and frame styles. In various embodiments, to create a framed photo or whiteboard 1230, users can click on or touch an empty section of a virtual wall in the mirrored world, and the Geollery servers can hang the frame 1230 outside the building by aligning the normal vectors of the wall and the frame.

In various embodiments, to encourage users to engage with their friends, the Geollery servers an provide virtual gift boxes 1260. Users can leave a gift box 1260 at any location in the mirrored world and their friends can open them and receive rewards in the form of a message or a picture. In various embodiments, gifts can also be secured via questions and answers.

Figure 14:
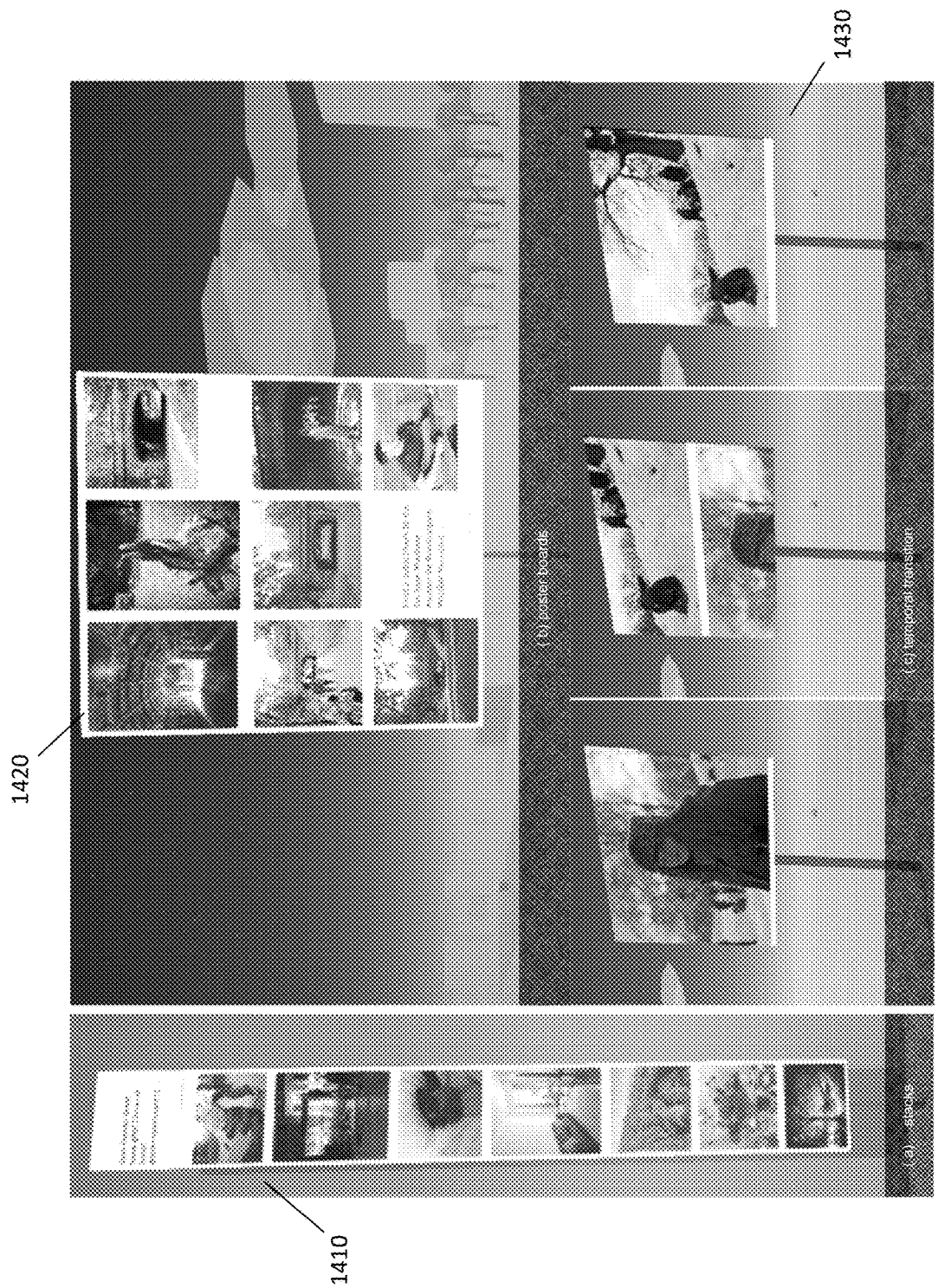
FIG. 14 is a diagram of exemplary techniques for aggregating social media posts in a mirrored world, in accordance with aspects of the present disclosure.

With the popularity of social media, a challenge of visualizing a large amount of social media in 3D spaces is visual clutter. When multiple social media are placed close together, their virtual representations may occlude each other. In accordance with aspects of the present disclosure, visual clutter can be address in various ways, and examples are shown in FIG. 14. In various embodiments, using a technique referred to herein as stacking 1410, older billboards are stacked upon the newer ones so that all co-located social media can be viewed at the same time. In various embodiments, social media can be laid out in a grid on a large poster board 1420. Compared to stacks 1410, poster boards 1420 do not place social media posts as high as stacks when more than three social media posts are aggregated together. In various embodiments, using a technique referred to herein as temporal transitions 1430, nearby social media within a particular radius are clustered into a single standard size billboard or balloon. The content displayed in the billboard or balloon dynamically changes between aggregated social media on a timer. In various embodiments, the particular radius can be 12 meters or another distance, and the timer can cycle a different social media post every 10 seconds or by another time duration. This temporal transition technique 1430 greatly reduces the visual clutter while displaying the latest information to the user. The advantage of stacks 1410 or poster boards 1420 is that multiple posts can be viewed at a glance, while the advantages of temporal transition 1430 are reducing the visual clutter and avoiding information overload. In various embodiments, applying topic models and/or temporal filters to social media can be used to reduce information overload. In various embodiments, users can filter the social media by time and/or by keywords, among other filters.

In accordance with aspects of the present disclosure, the disclosed technology can address user privacy in various ways. For example, when creating social media, users can select among multiple privacy options including: only visible to themselves, only visible to friends, and visible to the public. Additionally, if the Geollery servers permit tagging on photos, such a tagging feature can have a mechanism to mitigate multiparty privacy conflicts. As another example, users can set their avatar to be invisible to prevent exposing themselves to the public. Additionally, users can customize their display name to remain anonymous in the mirrored world.

Figure 15:
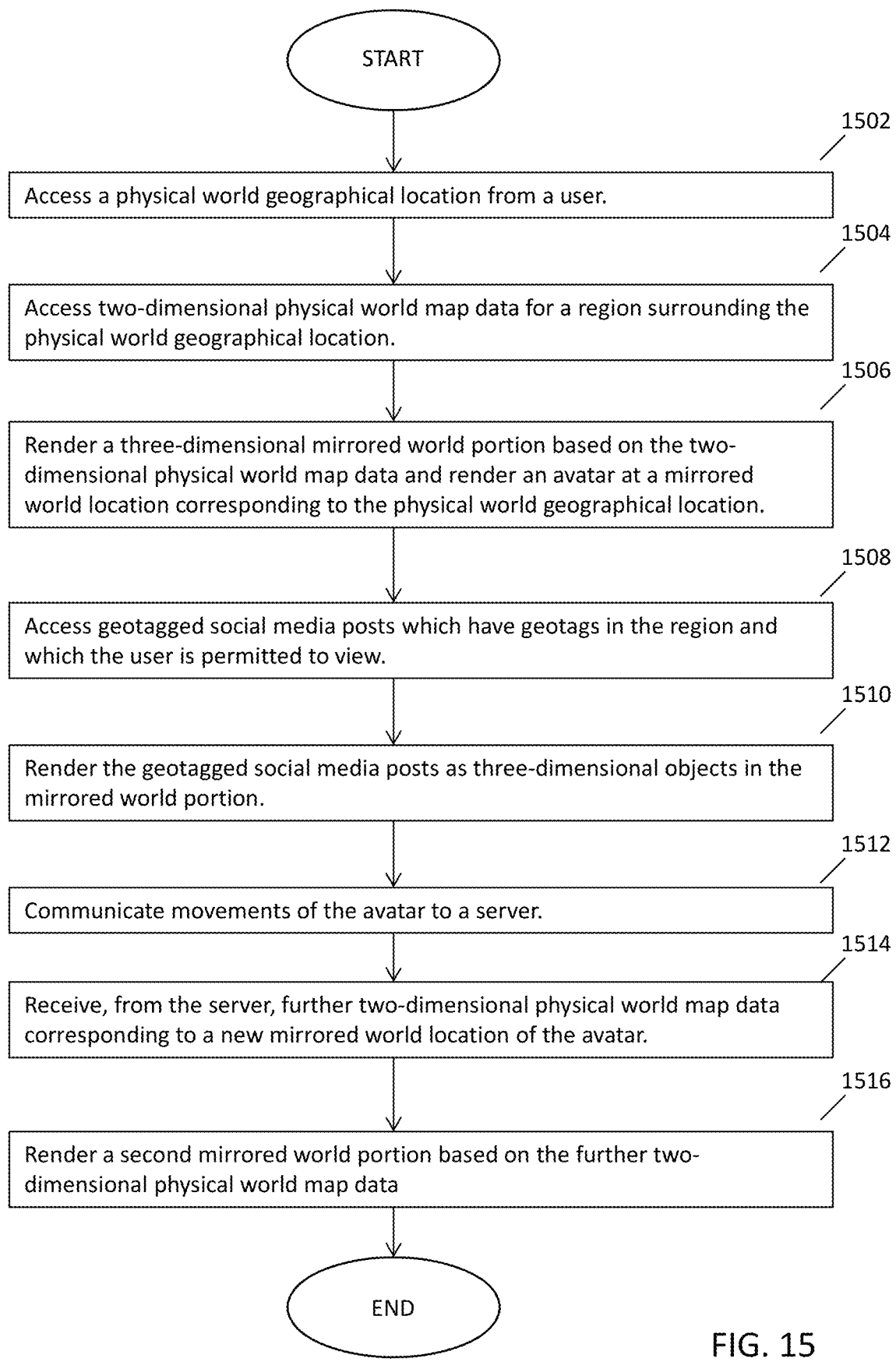
FIG. 15 is a flow diagram of an exemplary operation of rendering a mirrored world, in accordance with aspects of the present disclosure.

The above described systems and methods for providing a mirrored world with geotagged social media. FIG. 15 is a flow chart showing an exemplary process in accordance with the present disclosure. At block 1502, the process accesses a physical world geographical location from a user. The user can share a user device GPS location or can enter a desired geographical location. At block 1504, the process accesses two-dimensional physical world map data for a region surrounding the physical world geographical location. At block 1506, the process renders a three-dimensional mirrored world portion based on the two-dimensional physical world map data and renders an avatar at a mirrored world location corresponding to the physical world geographical location. In various embodiments, the mirrored world portion correspond to a 360-degree field of view about the mirrored world location. At block 1508, the process accesses geotagged social media posts which have geotags in the region and which the user is permitted to view, and at block 1510, the process renders the geotagged social media posts as three-dimensional objects in the mirrored world portion. The geotagged social media can be rendered as objects such as balloons, frames, whiteboards, and/or gift boxes, among other things. At block 1512, the process communicates movements of the avatar to a server, which can be a Geollery server. At block 1514, the process receives, from the server, further two-dimensional physical world map data corresponding to a new mirrored world location of the avatar. At block 1516, the process renders a second mirrored world portion based on the further two-dimensional physical world map data. In various embodiments, blocks 1512-1516 repeat as the avatar moves in the mirrored world, and portions of the mirrored world which are outside a frame of view/region of the avatar location are not rendered until the avatar moves towards them.

The following describes testing of the disclosed technology for generating an interactive and immersive mixed reality mirrored world with geotagged social media in real time. To evaluate the performance of the real-time approach, the Geollery servers were hosted on Amazon Web Services and the test was run on mobile phones, workstations, and head-mounted displays.

In the testing, a Least Recently Used (LRU) cache was used to store five most recent 360-degree street views and depth images, which enabled quick fetches of the previously accessed data from memory as users walk around, thereby minimizing bandwidth utilization and improving responsiveness. When switching between the fine and coarse detail (such as by users scrolling on workstation or pinch gestures on mobile platforms), the client devices applied an animated alpha blending to smoothly fade in the new geometries. By fusing multiple street view images, a larger area could be covered with fewer updates for loading new panoramas. Nevertheless, there is a trade-off between performance and creating many fine-detail geometries in such an approach, as each spherical geometry had 131,074 vertices to be processed by the GPU. However, such configurations are merely exemplary and can be varied depending on the desired application and computing resources.

In the testing, on a workstation equipped with an NVIDIA GTX 1080 GPU, it took about 12 ms to ship each 4096×2048 resolution street view image to the GPU after being decoded and stitched together in a background thread. For higher resolution 360-degree images, such as 8192×4096, it took about 40 ms to ship the texture from system memory to the GPU. After the geometries are initialized and all textures are cached on the GPU, rendering at a fine level of detail achieved over 60 frames per second (fps). Furthermore, the rendering pipeline took merely 2.0 ms, leaving a comfortable amount of GPU time to render additional objects. In a virtual reality system, the workstation was able to render at 90 fps to an Oculus Rift.

On an Android phone with a Snapdragon 835 processor, it took about 100 ms to ship each 4096×2048 resolution 360-degree image to the GPU. Afterwards, an average of 30 fps was achieved for rendering close-up views. On an iPhone XS with an A12 bionic processor, a frame rate of around 40 fps was achieved.

At a coarse level of detail when viewed from afar, the rendering performance becomes dependent on the number of buildings within view and the complexity of the buildings. In the testing, a smooth 60 fps was maintained on a workstation with display monitors, and 90 fps was achieved for rendering to an Oculus Rift with about 50 buildings visible in New York City.

In addition to system testing, user testing was also performed. The user testing recruited a total of 20 participants (10 females; age range: 21-30, with an average of 25.75 and standard deviation of 3.02). The individual semi-structured interviews took place in a quiet room using two side-by-side workstations with 27-inch displays and NVIDIA GTX 1080 graphics cards. Participants interacted with the presently disclosed system on one workstation and with the Social Street View system on the other workstation, using keyboards and mice alongside the interviewer. The session for each participant lasted between 45-60 minutes and involved four stages: a background interview, an exploration of Geollery and Social Street View, a quantitative evaluation, and a discussion about the future of 3D social media platforms.

In the first stage (5 minutes), the interviewer introduced Geollery and asked the participant about their prior experiences of social media. All of the participants reported social media usage of at least several times per week with few actively posting. Furthermore, 16 out of 20 responded with usage of several times per day. However, only 5 out of 20 actively posted social media frequently. The rest of the participants primarily use social media for viewing friends' updates and photos.

In the second stage (30-40 minutes), the interviewer instructed the participant to virtually visit four places using each of the target systems, Geollery and Social Street View. Participants were asked to explore the university campus where the study took place, the Manhattan District of New York, the National Gallery of Art in Washington D.C., and another location of the participant's choice. The user testing counterbalanced the order of system conditions (Geollery or Social Street View), as well as the order of the three places using the Latin square design.

After allowing the participants to freely explore each interface for 3 minutes, the interviewer asked the participants about their first impressions. In Geollery, many participants were amazed by walking in the mirrored world and the progressive loading of the geometries. In Social Street View, many participants appreciated the texturing of the 360-degree views. However, several participants found navigating Social Street View frustrating as they could not freely walk around, and could only teleport by clicking the mouse.

Other aspects of the user testing are detailed in U.S. Provisional Application No. 62/788,577, to which priority is claimed and which has been incorporated herein by reference. The user testing showed that applications for real-time, immersive, and interactive mixed reality systems with geo-tagged social media are different from what would be expected for traditional social media platforms. For example, the user testing indicates that use cases for Geollery including travel planning, virtual meetings, and family gathering. By incorporating spatial context, several use cases are possible that would not have been expected with traditional social media platforms.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. The embodiments described and illustrated herein are exemplary, and variations are contemplated to be within the scope of the present disclosure. Various embodiments disclosed herein can be combined in ways not expressly described herein, and such combinations are contemplated to be within the scope of the present disclosure. Other elements, steps, methods, and techniques that are insubstantially different from those described above and/or in the appended claims are also intended to be within the scope of the disclosure.

What is claimed is:

1. An end-user system comprising:
    a communication device configured to communicate with a server;
    a display screen;
    one or more processors; and
    at least one memory storing instructions which, when executed by the one or more processors, cause the end-user system to:
        access a physical world geographical location from a user;
        access at least two 360-degree street view images and depth maps for a region surrounding the physical world geographical location;
        render, for display on the display screen, a three-dimensional mirrored world portion based on the at least two 360-degree street view images and the depths maps, the rendering comprising fusing the at least two 360-degree street view images by:
            generating spherical geometries to represent the at least two 360-degree street view images,
            correcting a depth value for each vertex of the spherical geometries by sampling the depth maps with spherical coordinates,
            discarding pixels in intersections of the spherical geometries,
            texturing each spherical geometry with the corresponding 360-degree street view image,
            texturing seams where the spherical geometries meet by a weighted average of textures of the spherical geometries which meet at the seams,
            texturing the ground plane, and
            applying Gaussian filters in occluded regions which are not captured by any of the at least two 360-degree street view images;
        render an avatar at a mirrored world location corresponding to the physical world geographical location;
        access geotagged social media posts which have geotags in the region and which the user is permitted to view; and
        render the geotagged social media posts as three-dimensional objects in the mirrored world portion.

2. The end-user system of claim 1, wherein the rendered three-dimensional mirrored world portion corresponds to a 360-degree field of view about the mirrored world location.

3. The end-user system of claim 2, wherein other mirrored world portions outside the 360-degree field of view are not rendered until the avatar is moved toward the other mirrored world portions.

4. The end-user system of claim 3, wherein the instructions, when executed by the one or more processors, further cause the end-user system to:
    communicate, via the communication device, movements of the avatar to the server;
    receive, from the server, further 360-degree street view images corresponding to a new mirrored world location of the avatar; and
    render, for display on the display screen, a second mirrored world portion based on the further 360-degree street view images.

5. The end-user system of claim 1, wherein in rendering the three-dimensional mirrored world portion based on the at least two 360-degree street view images, the instructions, when executed by the one or more processors, cause the end-user system to:
    determine whether the mirrored world location is outside or inside a boundary of a mesh corresponding to the at least two 360-degree street view images;
    in case the mirrored world location is inside the boundary, render the three-dimensional mirrored world portion at a first level of detail; and
    in case the mirrored world location is outside the boundary, render the three-dimensional mirrored world portion at a second level of detail,
    wherein the first level of detail has greater detail than the second level of detail.

6. The end-user system of claim 5, wherein the instructions, when executed by the one or more processors, further cause the end-user system to access two-dimensional physical world map data.

7. The end-user system of claim 6, wherein in rendering the three-dimensional mirrored world portion at the second level of detail, the instructions, when executed by the one or more processors, cause the end-user system to:
    access polygon data and height data in the two-dimensional physical world map data, the polygon data and the height data relating to buildings;
    render three-dimensional polyhedrons corresponding to the buildings based on the polygon data and the height data; and
    texture sides of the polyhedrons corresponding to the at least two 360-degree street view images based on the at least two 360-degree street view images.

8. The end-user system of claim 5, wherein in rendering the three-dimensional mirrored world portion at the first level of detail, the instructions, when executed by the one or more processors, cause the end-user system to perform the fusing of the at least two 360-degree street view images.

9. The end-user system of claim 1, wherein in rendering the geotagged social media posts as three-dimensional objects in the mirrored world portion, the instructions, when executed by the one or more processors, cause the end-user system to render at least one of:
    a balloon object displaying a social media post, or
    a frame displaying one or more selected from a social media image, text, videos, and a collaborative drawing board.

10. The end-user system of claim 1, wherein in rendering the geotagged social media posts as three-dimensional objects in the mirrored world portion, the instructions, when executed by the one or more processors, cause the end-user system to render at least one of:

a stack of objects,
a poster grid of objects, or
a temporal transition of objects.

11. A method in an end-user system, the method comprising:
  accessing a physical world geographical location from a user;
  accessing at least two 360-degree street view images and depths maps for a region surrounding the physical world geographical location;
  rendering, for display on a display screen, a three-dimensional mirrored world portion based on the at least two 360-degree street view images and the depths maps, the rendering comprising fusing the at least two 360-degree street view images by:
    generating spherical geometries to represent the at least two 360-degree street view images,
    correcting a depth value for each vertex of the spherical geometries by sampling the depth maps with spherical coordinates,
    discarding pixels in intersections of the spherical geometries,
    texturing each spherical geometry with the corresponding 360-degree street view image,
    texturing seams where the spherical geometries meet by a weighted average of textures of the spherical geometries which meet at the seams,
    texturing the ground plane, and
    applying Gaussian filters in occluded regions which are not captured by any of the at least two 360-degree street view images;
  rendering an avatar at a mirrored world location corresponding to the physical world geographical location;
  accessing geotagged social media posts which have geotags in the region and which the user is permitted to view; and
  rendering the geotagged social media posts as three-dimensional objects in the mirrored world portion.

12. The method of claim 11, wherein the rendered three-dimensional mirrored world portion corresponds to a 360-degree field of view about the mirrored world location.

13. The method of claim 12, wherein other mirrored world portions outside the 360-degree field of view are not rendered until the avatar is moved toward the other mirrored world portions.

14. The method of claim 13, further comprising:
  communicating, via a communication device, movements of the avatar to a server;
  receiving, from the server, further 360-degree street view images corresponding to a new mirrored world location of the avatar; and
  rendering, for display on the display screen, a second mirrored world portion based on the further 360-degree street view images.

15. The method of claim 11, wherein rendering the three-dimensional mirrored world portion based on the at least two 360-degree street view images includes:
  determining whether the mirrored world location is outside or inside a boundary of a mesh corresponding to the at least two 360-degree street view images;
  in case the mirrored world location is inside the boundary, rendering the three-dimensional mirrored world portion at a first level of detail; and
  in case the mirrored world location is outside the boundary, rendering the three-dimensional mirrored world portion at a second level of detail,
  wherein the first level of detail has greater detail than the second level of detail.

16. The method of claim 15, further comprising accessing two-dimensional physical world map data.

17. The method of claim 16, wherein rendering the three-dimensional mirrored world portion at the second level of detail includes:
  accessing polygon data and height data in the two-dimensional physical world map data, the polygon data and the height data relating to buildings;
  rendering three-dimensional polyhedrons corresponding to the buildings based on the polygon data and the height data; and
  texturing sides of the polyhedrons corresponding to the at least two 360-degree street view images based on the at least two 360-degree street view images.

18. The method of claim 15, wherein rendering the three-dimensional mirrored world portion at the first level of detail includes performing the fusing of the at least two 360-degree street view images.

19. The method of claim 11, wherein rendering the geotagged social media posts as three-dimensional objects in the mirrored world portion includes rendering at least one of:
  a balloon object displaying a social media post, or
  a frame displaying one or more selected from a social media image, text, videos, and a collaborative drawing board.

20. The method of claim 11, wherein rendering the geotagged social media posts as three-dimensional objects in the mirrored world portion includes rendering at least one of:
  a stack of objects,
  a poster grid of objects, or
  a temporal transition of objects.

* * * * *